United States Patent
Abdelghaffar et al.

(10) Patent No.: US 11,539,415 B2
(45) Date of Patent: Dec. 27, 2022

(54) ON DEMAND CHANNEL STATE INFORMATION MEASUREMENT AND REPORTING WITH ADAPTIVE RECEIVE ANTENNAS

(71) Applicant: QUALCOMM Incorporated, San Diego, CA (US)

(72) Inventors: Muhammad Sayed Khairy Abdelghaffar, San Jose, CA (US); Alexandros Manolakos, Escondido, CA (US); Weimin Duan, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/064,997

(22) Filed: Oct. 7, 2020

(65) Prior Publication Data

US 2021/0111775 A1    Apr. 15, 2021

(30) Foreign Application Priority Data

Oct. 11, 2019 (GR) .............................. 20190100454

(51) Int. Cl.
*H04B 7/06* (2006.01)
*H04L 5/00* (2006.01)

(52) U.S. Cl.
CPC ......... *H04B 7/0626* (2013.01); *H04B 7/0634* (2013.01); *H04L 5/0053* (2013.01); *H04L 5/0098* (2013.01)

(58) Field of Classification Search
CPC .. H04B 7/0626; H04B 7/0634; H04B 7/0628; H04B 7/0874; H04B 7/0691;
(Continued)

(56) References Cited

U.S. PATENT DOCUMENTS

| 9,673,945 B2 | 6/2017 | Geirhofer et al. |
| 2016/0036637 A1* | 2/2016 | Malik ................. H04L 41/0816 370/329 |

(Continued)

FOREIGN PATENT DOCUMENTS

| EP | 3456083 A1 | 3/2019 |
| WO | WO-2012112291 A1 | 8/2012 |
| WO | WO-2017052833 A1 | 3/2017 |

OTHER PUBLICATIONS

International Search Report and Written Opinion—PCT/US2020/054823—ISA/EPO—dated Dec. 16, 2020.

*Primary Examiner* — Kiet Tang
(74) *Attorney, Agent, or Firm* — Holland & Hart LLP

(57) ABSTRACT

Methods, systems, and devices for wireless communications are described. A communication device, which may be otherwise known as a user equipment (UE), may determine a capability relating to an antenna configuration associated with channel state information reporting. The UE may transmit a message including an indication of the capability, and receive a channel state information reference signal using the antenna configuration. The UE may transmit, based on the channel state information reference signal, a channel state information report in accordance with the antenna configuration associated with the channel state information reporting.

30 Claims, 17 Drawing Sheets

(58) Field of Classification Search
CPC ..... H04B 7/063; H04L 5/0053; H04L 5/0098; H04L 5/0023; H04L 5/005; H04L 5/0057; H04L 1/0027; Y02D 30/70; H04W 52/028
See application file for complete search history.

(56) References Cited

U.S. PATENT DOCUMENTS

2017/0094545 A1* 3/2017 Subrahmanya ....... H04L 1/0027
2019/0199005 A1* 6/2019 Ozozlu ................ H04B 7/0691

* cited by examiner

ON DEMAND CHANNEL STATE INFORMATION MEASUREMENT AND REPORTING WITH ADAPTIVE RECEIVE ANTENNAS

CROSS REFERENCE

The present Application for Patent claims the benefit of Greece Provisional Patent Application No. 20190100454 by ABDELGHAFFAR et al., entitled "ON DEMAND CHANNEL STATE INFORMATION MEASUREMENT AND REPORTING WITH ADAPTIVE RECEIVE ANTENNAS," filed Oct. 11, 2019, assigned to the assignee hereof, and expressly incorporated by reference herein.

FIELD OF TECHNOLOGY

The following relates to wireless communications and more specifically to on demand channel state information measurement and reporting with adaptive receive antennas.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UEs). Some wireless communications systems may support high reliability and low latency communications. Some wireless communications systems may also support channel measurement and reporting to support the high reliability and low latency communications.

SUMMARY

The described techniques may relate to configuring a communication device, which may be otherwise known as user equipment (UEs), to support on demand channel state information measurement and reporting with adaptive receive antennas. The communication device may be configured, in some examples, to determine a capability relating to an antenna configuration associated with the channel state information reporting. In some examples, the capability may relate to a first power mode or a second power mode. When operating in the first power mode, the communication device may use a set of receive antennas (e.g., all receive antennas of the communication device) to receive channel state information reference signals, or physical data channels, or a combination thereof. Alternatively, when operating in the second power mode, the communication device may use a subset of the set of receive antennas compared to the normal power mode to receive the channel state information reference signals, or the physical data channels, or a combination thereof. The communication device may, therefore, activate or deactivate, in an adaptive manner, receive antennas of the antenna configuration based on the power mode.

The communication device may also support on demand feedback to reduce or eliminate a discrepancy of the channel state information reporting expectations. For example, there may be a difference between a UE and a base station (e.g., eNodeB (eNBs), next-generation NodeB or giga-NodeB (any of which may be referred to as a gNB)) determination of the antenna configuration for the channel state information reference signals measurements and/or the physical data shared channels reception. By supporting on demand feedback to include an indication that a previous channel state information report is invalid (or the antenna configuration associated with the channel state information reporting), the UE and the base station may avoid discrepancy in the channel state information reporting expectations. This may enable the base station to make a correct choice scheduling the UE based on the actual channel statistics measured at the UE. The communication device may, as a result, include features for improvements to power consumption, spectral efficiency, higher data rates and, in some examples, may promote enhanced efficiency for high reliability and low latency operations, among other benefits by supporting on demand channel state information measurement and reporting with adaptive receive antennas.

A method of wireless communication is described. The method may include determining a capability relating to an antenna configuration associated with channel state information reporting, transmitting a message including an indication of the capability, receiving a channel state information reference signal using the antenna configuration, and transmitting, based on the channel state information reference signal, a channel state information report in accordance with the antenna configuration associated with the channel state information reporting.

An apparatus for wireless communication is described. The apparatus may include a processor, memory coupled with the processor, and instructions stored in the memory. The instructions may be executable by the processor to cause the apparatus to determine a capability relating to an antenna configuration associated with channel state information reporting, transmit a message including an indication of the capability, receive a channel state information reference signal using the antenna configuration, and transmit, based on the channel state information reference signal, a channel state information report in accordance with the antenna configuration associated with the channel state information reporting.

Another apparatus for wireless communication is described. The apparatus may include means for determining a capability relating to an antenna configuration associated with channel state information reporting, transmitting a message including an indication of the capability, receiving a channel state information reference signal using the antenna configuration, and transmitting, based on the channel state information reference signal, a channel state information report in accordance with the antenna configuration associated with the channel state information reporting.

A non-transitory computer-readable medium storing code for wireless communication is described. The code may include instructions executable by a processor to determine a capability relating to an antenna configuration associated with channel state information reporting, transmit a message including an indication of the capability, receive a channel state information reference signal using the antenna configuration, and transmit, based on the channel state information reference signal, a channel state information report in accordance with the antenna configuration associated with the channel state information reporting.

Some examples of the method, apparatuses, and non-transitory computer-readable medium described herein may further include operations, features, means, or instructions for selecting, based on the capability, a first power mode or a second power mode to receive channel state information reference signals, or physical data channels, or a combination thereof, and activating or deactivating receive antennas of the antenna configuration based on the selected power mode.

Some examples of the method, apparatuses, and non-transitory computer-readable medium described herein may further include operations, features, means, or instructions for selecting the first power mode or the second power mode, or activating or deactivating the receive antennas may be based on one or more of receiving the channel state information reference signal or receiving a channel state information trigger report.

Some examples of the method, apparatuses, and non-transitory computer-readable medium described herein may further include operations, features, means, or instructions for switching between the first power mode and the second power mode based on one or more of receiving the channel state information reference signal or receiving a channel state information trigger report.

Some examples of the method, apparatuses, and non-transitory computer-readable medium described herein may further include operations, features, means, or instructions for switching between the first power mode and the second power mode based on a bandwidth part switching occasion.

Some examples of the method, apparatuses, and non-transitory computer-readable medium described herein may further include operations, features, means, or instructions for switching between the first power mode and the second power mode within a bandwidth part.

Some examples of the method, apparatuses, and non-transitory computer-readable medium described herein may further include operations, features, means, or instructions for activating the receive antennas when the first power mode may be selected, where activating the receive antennas includes activating all receives antennas.

Some examples of the method, apparatuses, and non-transitory computer-readable medium described herein may further include operations, features, means, or instructions for deactivating a subset of the receive antennas when the second power mode may be selected, and measuring the channel state information reference signals or receiving the physical data channels, or a combination thereof using the activated receive antennas.

Some examples of the method, apparatuses, and non-transitory computer-readable medium described herein may further include operations, features, means, or instructions for measuring the channel state information reference signals using the receive antennas, and transmitting the channel state information report based on the measuring.

Some examples of the method, apparatuses, and non-transitory computer-readable medium described herein may further include operations, features, means, or instructions for receiving the physical data channels using the receive antennas, where the physical data channels include physical downlink shared channels, and transmitting the channel state information report based on the receiving.

In some examples of the method, apparatuses, and non-transitory computer-readable medium described herein, the first power mode corresponds to a first channel state information report, and the second power mode corresponds to a second channel state information report different from the first channel state information report.

In some examples of the method, apparatuses, and non-transitory computer-readable medium described herein, the first power mode and the second power mode correspond to a same channel state information report.

Some examples of the method, apparatuses, and non-transitory computer-readable medium described herein may further include operations, features, means, or instructions for including, in the same channel state information report, one or more of a channel quality indicator, a precoding matrix indicator, a rank indicator, or a combination thereof based on the receive antennas.

Some examples of the method, apparatuses, and non-transitory computer-readable medium described herein may further include operations, features, means, or instructions for transmitting a feedback message based on activating or deactivating the receive antennas.

In some examples of the method, apparatuses, and non-transitory computer-readable medium described herein, the feedback message includes an indication that a previous channel state information report may be invalid based on the activating or deactivating.

In some examples of the method, apparatuses, and non-transitory computer-readable medium described herein, the feedback message includes an indication of the first power mode or the second power mode.

Some examples of the method, apparatuses, and non-transitory computer-readable medium described herein may further include operations, features, means, or instructions for enabling a bit indication in a channel state information report, the bit indication including an indication of an on demand feedback related to the antenna configuration associated with the channel state information reporting.

Some examples of the method, apparatuses, and non-transitory computer-readable medium described herein may further include operations, features, means, or instructions for determining a format of a feedback message, and transmitting the feedback message according to the format.

In some examples of the method, apparatuses, and non-transitory computer-readable medium described herein, the feedback message may be an on demand feedback message.

In some examples of the method, apparatuses, and non-transitory computer-readable medium described herein, the format includes a scheduling request format.

In some examples of the method, apparatuses, and non-transitory computer-readable medium described herein, the format includes a sounding reference signal format.

In some examples of the method, apparatuses, and non-transitory computer-readable medium described herein, the format includes a physical uplink control channel format.

In some examples of the method, apparatuses, and non-transitory computer-readable medium described herein, the format includes a medium access control (MAC) channel element (CE) format.

Some examples of the method, apparatuses, and non-transitory computer-readable medium described herein may further include operations, features, means, or instructions for receiving a second message including a second indication of one or more of an aperiodic channel state information reporting configuration for channel state information with an aperiodic channel state information report, and transmitting the aperiodic channel state information report according to the aperiodic channel state information reporting configuration.

Some examples of the method, apparatuses, and non-transitory computer-readable medium described herein may further include operations, features, means, or instructions for determining a value of a channel state information report timer, and transmitting a channel state information report based on the value of the channel state information report timer satisfying a threshold.

Some examples of the method, apparatuses, and non-transitory computer-readable medium described herein may further include operations, features, means, or instructions for receiving a second message including a second indication of one or more to avoid determining an average of a channel quality indicator over a set of channel state information reference signal occasions or to transmit exclusively a latest channel state information report.

Some examples of the method, apparatuses, and non-transitory computer-readable medium described herein may further include operations, features, means, or instructions for receiving a channel state information reference signal over a channel state information reference signal occasion, determining a channel quality indicator based on the channel state information reference signal, and transmitting exclusively a channel state information report indicating the channel quality indicator associated with the channel state information reference signal occasion.

Some examples of the method, apparatuses, and non-transitory computer-readable medium described herein may further include operations, features, means, or instructions for establishing a connection with a base station, where determining the capability may be based on the connection, and transmitting the message including the indication of the capability to the base station.

A method of wireless communication is described. The method may include receiving a message including an indication of a capability relating to an antenna configuration associated with channel state information reporting, transmitting a channel state information reference signal based on the capability, and receiving, based on the channel state information reference signal, a channel state information report in accordance with the antenna configuration associated with the channel state information reporting.

An apparatus for wireless communication is described. The apparatus may include a processor, memory coupled with the processor, and instructions stored in the memory. The instructions may be executable by the processor to cause the apparatus to receive a message including an indication of a capability relating to an antenna configuration associated with channel state information reporting, transmit a channel state information reference signal based on the capability, and receive, based on the channel state information reference signal, a channel state information report in accordance with the antenna configuration associated with the channel state information reporting.

Another apparatus for wireless communication is described. The apparatus may include means for receiving a message including an indication of a capability relating to an antenna configuration associated with channel state information reporting, transmitting a channel state information reference signal based on the capability, and receiving, based on the channel state information reference signal, a channel state information report in accordance with the antenna configuration associated with the channel state information reporting.

A non-transitory computer-readable medium storing code for wireless communication is described. The code may include instructions executable by a processor to receive a message including an indication of a capability relating to an antenna configuration associated with channel state information reporting, transmit a channel state information reference signal based on the capability, and receive, based on the channel state information reference signal, a channel state information report in accordance with the antenna configuration associated with the channel state information reporting.

Some examples of the method, apparatuses, and non-transitory computer-readable medium described herein may further include operations, features, means, or instructions for identifying a bit indication in the channel state information report, the bit indication including an indication of an on demand feedback related to the antenna configuration associated with the channel state information reporting.

Some examples of the method, apparatuses, and non-transitory computer-readable medium described herein may further include operations, features, means, or instructions for determining one or more of the channel state information reporting or the antenna configuration associated with the channel state information reporting based on the on demand feedback.

Some examples of the method, apparatuses, and non-transitory computer-readable medium described herein may further include operations, features, means, or instructions for receiving a feedback message based on the on demand feedback.

In some examples of the method, apparatuses, and non-transitory computer-readable medium described herein, the feedback message includes an indication that a previous channel state information report may be invalid.

In some examples of the method, apparatuses, and non-transitory computer-readable medium described herein, the feedback message includes an indication of a first power mode or a second power mode.

Some examples of the method, apparatuses, and non-transitory computer-readable medium described herein may further include operations, features, means, or instructions for determining a format of the feedback message, where receiving the feedback message may be based on the format.

In some examples of the method, apparatuses, and non-transitory computer-readable medium described herein, the feedback message may be an on demand feedback message.

In some examples of the method, apparatuses, and non-transitory computer-readable medium described herein, the format includes a scheduling request format.

In some examples of the method, apparatuses, and non-transitory computer-readable medium described herein, the format includes a sounding reference signal format.

In some examples of the method, apparatuses, and non-transitory computer-readable medium described herein, the format includes a physical uplink control channel format.

In some examples of the method, apparatuses, and non-transitory computer-readable medium described herein, the format includes a MAC-CE format.

DETAILED DESCRIPTION

Figure 1:
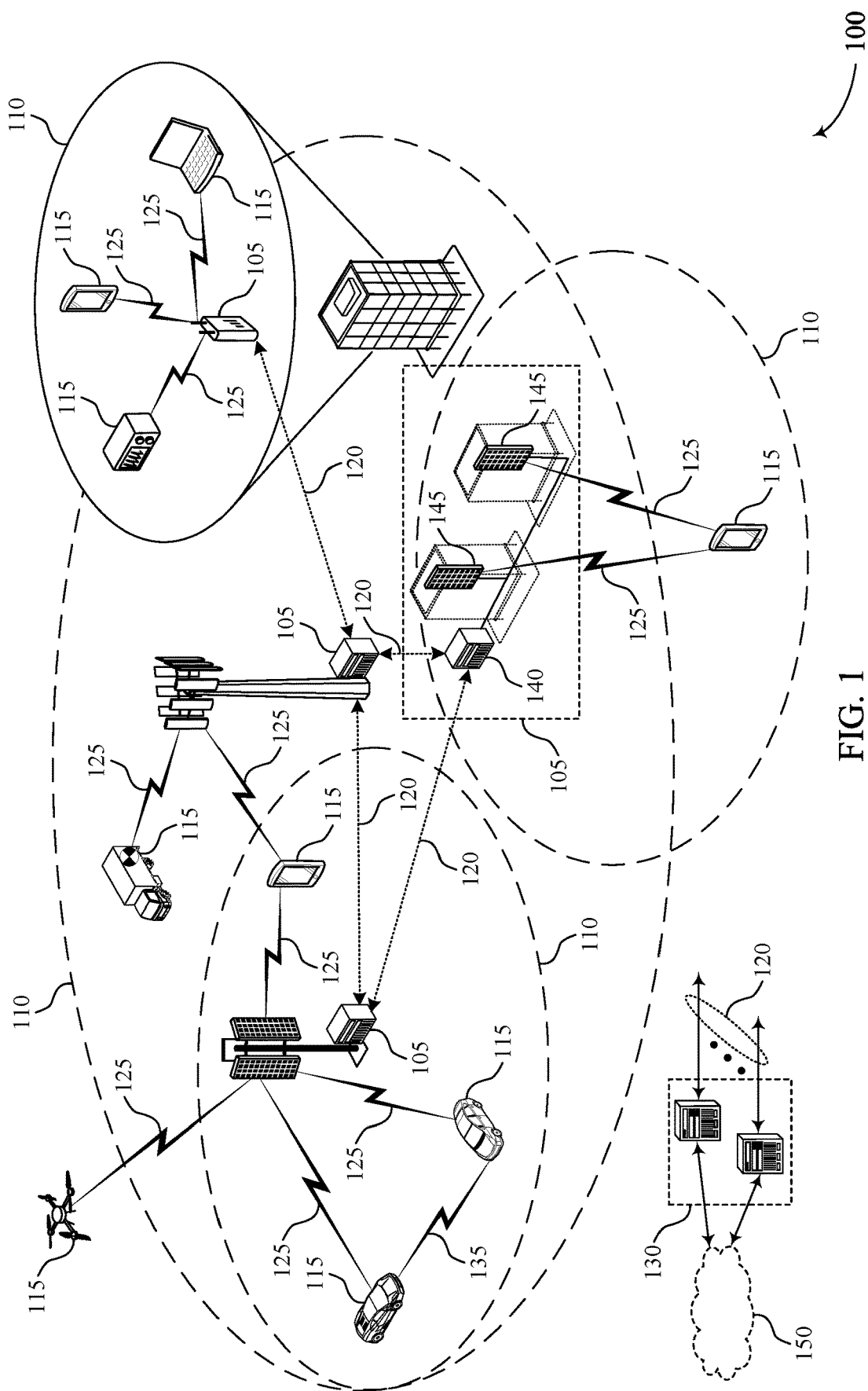
FIGS. 1 and 2 illustrate examples of a wireless communications system that support on demand channel state information measurement and reporting with adaptive receive antennas in accordance with aspects of the present disclosure.

Some wireless communication systems may include one or more communication devices, such as user equipment (UEs) and base stations, for example, next-generation NodeBs or giga-NodeBs (either of which may be referred to as a gNB) that may support multiple radio access technologies including 4G systems such as Long Term Evolution (LTE) systems, fifth generation (5G) systems which may be referred to as New Radio (NR) systems. Some wireless communications systems may support channel measurement and reporting to support high reliability and low latency communications for one or more of the above example radio access technologies. The UEs may be configured, in some examples, to determine a capability relating to an antenna configuration associated with the channel state information reporting. In some examples, the capability may relate to a first power mode or a second power mode. The first power mode may be referred to herein as "a normal power mode," while the second power mode may be referred to herein as "a low power mode."

In some examples, when operating in the normal power mode, the UEs may use a set of receive antennas (e.g., all receive antennas of the UEs) to receive channel state information reference signals, or physical data channels, or a combination thereof. Alternatively, when operating in the low power mode, the UEs may use a subset of the set of receive antennas compared to the normal power mode to receive the channel state information reference signals, or the physical data channels, or a combination thereof. The UEs may, therefore, activate or deactivate, in an adaptive manner, receive antennas of the antenna configuration based on the power mode.

In some examples, the UEs may also support on demand feedback to reduce or eliminate a variance of the channel state information reporting expectations. For example, there may be a difference between the UEs and the base stations determination of the antenna configuration for the channel state information reference signals measurements and/or the physical data shared channels reception. By supporting on demand feedback to include an indication that a previous channel state information report is invalid (or the antenna configuration associated with the channel state information reporting), the UEs and the base stations may evade discrepancy in the channel state information reporting expectations and may lead to proper scheduling decisions by the base station.

Particular aspects of the subject matter described in this disclosure may be implemented to realize one or more of the following potential advantages. The techniques employed by the described one or more communication devices may provide benefits and enhancements to the operation of the communication devices. For example, operations performed by the described one or more communication devices may provide improvements to power saving operations. In some examples, the described one or more communication devices may support high reliability and low latency communications, among other examples, in accordance with on demand channel state information measurement and reporting with adaptive receive antennas. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are then illustrated by and described with reference to a process flow that relates to on demand channel state information measurement and reporting with adaptive receive antennas. Aspects of the disclosure are further illustrated by and described with reference to apparatus diagrams, system diagrams, and flowcharts that relate to on demand channel state information measurement and reporting with adaptive receive antennas in wireless communications systems.

FIG. 1 illustrates an example of a wireless communications system 100 that supports on demand channel state information measurement and reporting with adaptive receive antennas in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices. In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
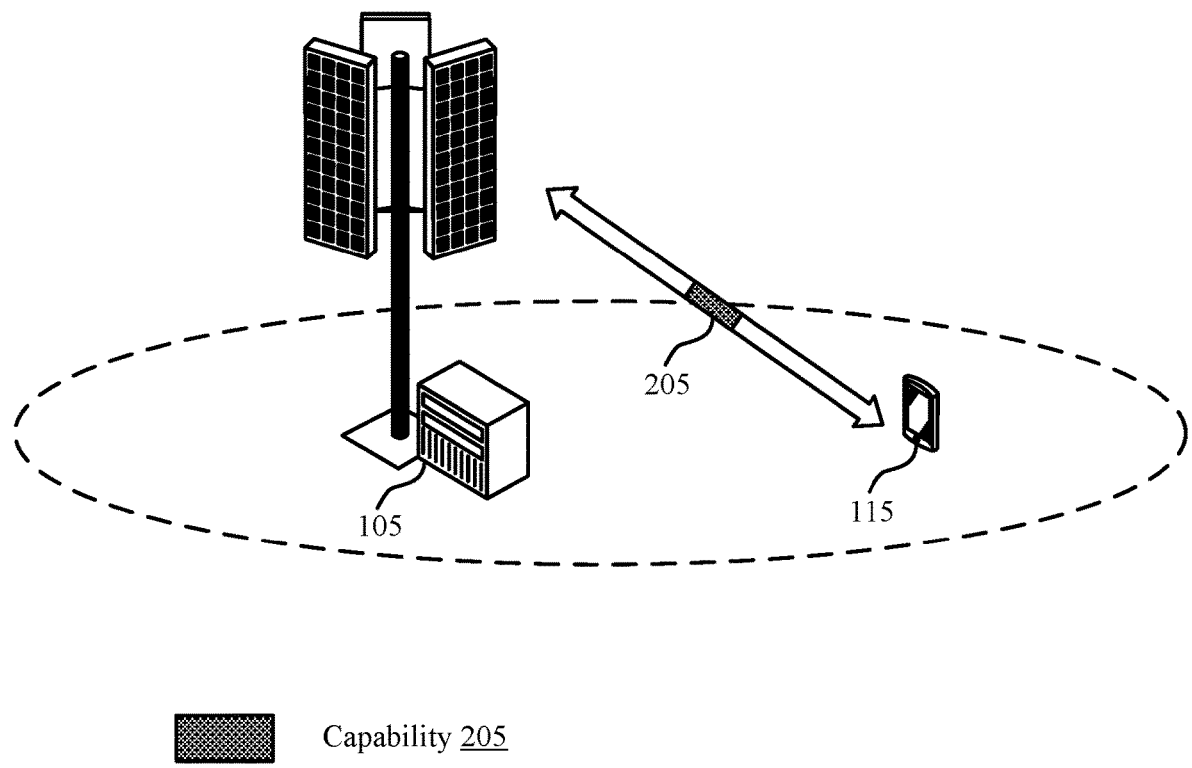

FIG. 2 illustrates an example of a wireless communications system 200 that supports on demand channel state information measurement and reporting with adaptive receive antennas in accordance with aspects of the present disclosure. The wireless communications system 200 may include a base station 105 and a UE 115, which may be examples of the corresponding devices described with reference to FIG. 1. In some examples, the wireless communications system 200 may implement aspects of the wireless communications system 100. For example, the wireless communications system 200 may be a multiple-access communications system. One or more of the base station 105 or the UE 115 may be configured with multiple antennas, which may be used to employ techniques such as transmit diversity, receive diversity, multiple-input multiple-output (MIMO) communications, or beamforming.

The antennas of the base station 105 or the UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with the base station 105 may be located in diverse geographic locations. The base station 105 may have an antenna array with a number of rows and columns of antenna ports that the base station 105 may use to support beamforming of communications with the UE 115. Likewise, the UE 115 may have one or more antenna arrays that may support various MIMO or beamforming operations. Additionally or alternatively, an antenna panel may support radio frequency beamforming for a signal transmitted via an antenna port.

The base station 105 or the UE 115 may, in some examples, use MIMO communications to exploit multipath signal propagation and increase the spectral efficiency by transmitting or receiving multiple signals via different spatial layers (e.g., MIMO layers). Such techniques may be referred to as spatial multiplexing. The multiple signals may, for example, be transmitted by one or more of the base station 105 or the UE 115 via different antennas or different combinations of antennas. Likewise, the multiple signals may be received by one or more of the base station 105 or the UE 115 via different antennas or different combinations of antennas. Each of the multiple signals may be referred to as a separate spatial stream (e.g., MIMO layer) and may carry bits associated with the same data stream (e.g., the same codeword) or different data streams (e.g., different codewords).

Different spatial layers (e.g., MIMO layers) may be associated with different antenna arrays or antenna panels used for channel measurement and reporting. Channel measurement may include measuring one or more reference signals. For example, the base station 105 may transmit a channel state information reference signal, which the UE 115 may receive and measure on one or more antennas within one or more antenna arrays or antenna panels. The UE 115 may, based on the measurement of the channel state information reference signal, generate and transmit a channel state information report including one or more of a channel quality indicator, a precoding matrix indicator, a rank indicator, or a combination thereof.

One or more of the base station 105 or the UE 115 power consumption may be dependent on a number of spatial layers (e.g., maximum number of MIMO layers). In some examples, to process a relative high number of spatial layers, one or more of the base station 105 or the UE 115 may use a large number of integrated circuit resources. In other words, the power consumption, by one or more of the base station 105 or the UE 115, between radio frequency integrated circuit resources and baseband integrated circuit resources may be high (e.g., above a threshold). In some examples, the radio frequency integrated circuit resources may be high because one or more of the base station 105 or the UE 115 may activate a high number of antennas (e.g., above a threshold number of antennas) within one or more antenna arrays or antenna panels for signal propagation (e.g., signal transmission, signal reception). In some other examples, the baseband integrated circuit resources may be high because of high complex decoding operations (e.g., maximum MIMO decoding operations) by one or more of the base station 105 or the UE 115. In some examples, to reduce the integrated circuit resources and as an extension decrease power consumption, one or more of the base station 105 or the UE 115 may use an indication of a number of spatial layers (e.g., maximum number of MIMO layers) to save power by adapting a number of antennas and baseband integrated circuit resources (e.g., baseband processing). In some examples, the number of spatial layers may be a maximum number of spatial layers.

In some examples, one or more of the base station 105 or the UE 115 may experience a mismatch between the base station 105 and the UE 115 expectations (or understanding) of a number of antennas that the UE 115 may use to receive physical channels (e.g., physical data shared channels (PD-SCHs)) and a number of antennas that the UE 115 may use to perform channel measurement (e.g., channel state information reference signal measurements) and/or reporting (e.g., channel state information reporting). In an example configuration, the UE 115 may be configured to use at least a set of antennas (i.e., at least four receive antennas). In some examples, the UE 115 may exclusively activate a subset of the set of antennas based on a number of spatial layers (i.e., a maximum number of MIMO layers). For example, the UE 115 may exclusively activate two of four antennas based on a number of spatial layers being two (i.e., a maximum number of MIMO layers is two).

The UE 115 may use the subset of antenna (e.g., two antennas) to receive and measure channel state information reference signals and physical channels (e.g., PDSCHs). In other examples, the UE 115 may use the set of antennas (e.g., four antennas) to receive and measure channel state information reference signals, and the subset (e.g., two antennas) to receive and measure physical channels. The mismatch thus occurs between a channel state information report related to a subset of antennas (e.g., two antennas) and an actual channel state information report related to the set of antennas (e.g., four antennas). This channel state information mismatch means that the reported information (e.g., a channel quality indicator, a precoding matrix indicator, a rank indicator, or a combination thereof) in the report may be lower than the information reported in an actual channel quality report (e.g., a channel quality indicator, a precoding matrix indicator, a rank indicator, or a combination thereof) related to the set of antennas (e.g., all of the antennas of the UE 115).

Figure 3:
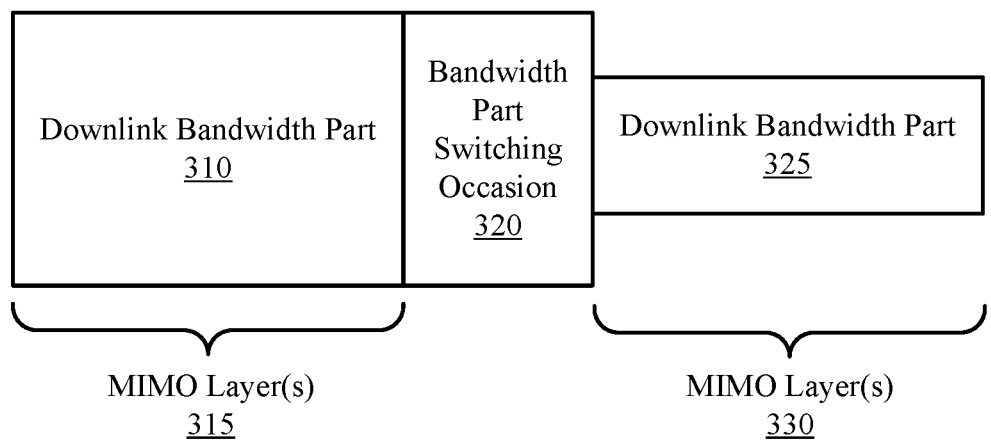
FIG. 3 illustrates an example of a diagram that supports on demand channel state information measurement and reporting with adaptive receive antennas in accordance with aspects of the present disclosure.
Figure 3:
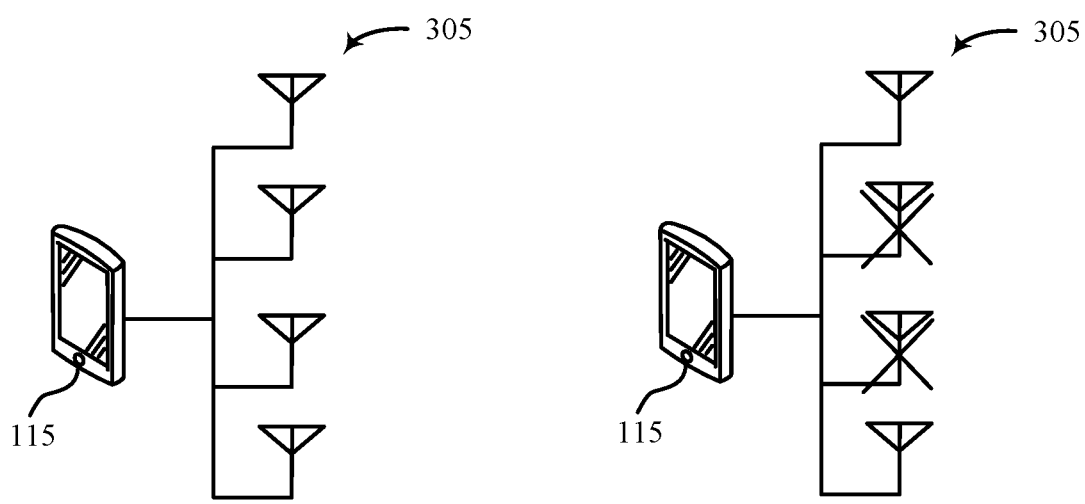
Figure 3:
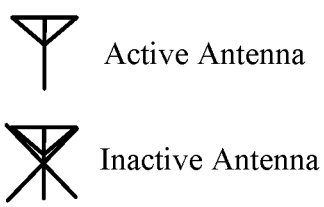

FIG. 3 illustrates an example of a diagram 300 that supports on demand channel state information measurement and reporting with adaptive receive antennas in accordance with aspects of the present disclosure. The diagram 300 may include a UE 115, which may be examples of the corresponding devices described with reference to FIGS. 1 and 2. In some examples, the UE 115 may be configured with multiple antennas 305, which may be used to employ techniques such as MIMO communications, etc. In some examples, the UE 115 may operate within a downlink bandwidth part 310, which may correspond to one or more MIMO layers 315 and one or more antennas 305. The downlink bandwidth part 310 may correspond to time and frequency resources (e.g., symbols, subcarriers). As shown in FIG. 3, when operating within the downlink bandwidth part 310, the UE 115 may activate all of the antennas 305 (e.g., for channel measurement and reporting, physical channel reception). In some examples, the UE 115 may change between bandwidth parts during a bandwidth part switching occasion 320. For example, the UE 115 may switch from the downlink bandwidth part 310 to a downlink bandwidth part 325. In some examples, the downlink bandwidth part 310 may occupy more time or frequency resources compared to the downlink bandwidth part 325. In other examples, the downlink bandwidth part 310 may occupy fewer time or frequency resources compared to the downlink bandwidth part 325.

The downlink bandwidth part 325 may correspond to one or more MIMO layers 330 and the one or more antennas 305. As shown in FIG. 3, when operating within the downlink bandwidth part 325, the UE 115 may activate or deactivate a subset of the antennas 305 (e.g., for channel measurement and reporting, physical channel reception). Due to the bandwidth part switching and resulting change in number of active antennas for channel measurement and reporting, physical channel reception, etc. there may be a mismatch in channel state information reporting. Additionally or alternatively, the mismatch may occur due to a change in antennas for channel measurement and reporting, physical channel reception, etc. as part of the UE 115 antenna adaptation within the bandwidth parts. For example, when operating in accordance with two MIMO layers, the UE 115 may activate two, three, or four antennas. As demand for communication efficiency increases, the UE 115 may be unable to support reliable communications due to channel state information mismatch.

Returning to FIG. 2, one or more of the base station 105 or the UE 115 may support on demand channel state information measurement and reporting with adaptive receive antennas for power saving operations to mitigate channel state information reporting mismatch between the base station 105 or the UE 115. In some examples, the UE 115 may be configured to determine a capability 205 relating to an antenna configuration associated with channel state information reporting. An antenna configuration may relate to one or more antennas of the UE 115 (e.g., such as one or more antennas 305 described in FIG. 3) that may be located within one or more antenna arrays or antenna panels. In some cases, the antenna configuration may refer to a panel configuration that relates to one or more antenna panels of the UE 115. In some examples, the capability 205 may relate to one or more power modes. For example, the UE 115 may be configured to support one or more power modes.

An example power mode may be referred to herein as "a normal power mode," while another example power mode may be referred to herein as "a lower power mode." When operating in the normal power mode, the UE 115 may use a set of antennas (e.g., receive antennas of the antenna configuration) to receive channel state information reference signals, or physical data channels (e.g., PDSCHs), or a combination thereof from the base station 105. Alternatively, when operating in the low power mode, the UE 115 may use a subset of the set of antennas compared to the normal power mode to receive the channel state information reference signals, or the physical data channels, or a combination thereof. In some examples, the UE 115 may select, based on the capability 205, the normal power mode or the low power mode to receive channel state information reference signals, or physical data channels, or a combination thereof. Based on the selection, the UE 115 may activate or deactivate one or more antennas of the antenna configuration. In some examples, the UE 115 may activate or deactivate one or more antenna panels based on the selection.

The UE 115 may switch between the normal power mode or the low power mode, as well as activate or deactivate one or more antennas relating to the antenna configuration based on one or more factors. For example, the UE 115 may switch between the normal power mode or the low power mode based on receiving a channel state information reference signal from the base station 105. The UE 115 may thus be configured to activate or deactivate one or more antennas relating to the antenna configuration based on receiving the channel state information reference signal. In some examples, the UE 115 may maintain the antenna configuration (e.g., number of active or inactive antennas) until it receives the channel state information reference signal. The UE 115 may therefore be unable to activate or deactivate antennas relating to the antenna configuration without receiving the channel state information reference signal.

Additionally or alternatively, the UE 115 may switch between the normal power mode or the low power mode based on a bandwidth part switching occasion. A bandwidth part switching occasion may relate to the UE 115 changing a bandwidth part, which may correspond to different number of spatial layers (e.g., maximum MIMO layers). In some examples, the UE 115 may switch between the normal power mode or the low power mode within a bandwidth part, as described in FIG. 3. In some examples, the UE 115 may activate one or more antennas relating to the antenna configuration when the normal power mode is selected. In some other examples, the UE 115 may deactivate one or more antennas relating to the antenna configuration when the low power mode is selected, and measure channel state information reference signals or receive physical data channels, or a combination thereof using the activated antennas.

In some examples, the UE 115 may transmit a message including an indication of the capability 205. Alternatively, the UE 115 may be configured to refrain from sharing the indication of the capability 205 to the base station 105. The UE 115 may thus according to the capability 205 relating to the antenna configuration perform channel measurement and reporting, etc. For example, the UE 115 may receive a channel state information reference signal using the antenna configuration, and transmit a channel state information report in accordance with the antenna configuration associated with the channel state information reporting.

In some examples, the UE 115 may be configured with one or more channel state information reports. For example, the UE 115 may be configured to generate and transmit a first channel state information report corresponding to the normal power, and a second channel state information report different from the first channel state information report corresponding to the low power mode. Here, the UE 115 may be configured with two channel state information reports with each one corresponding to different power modes of the UE 115, as well as a number of activated antennas relating to the antenna configuration. In some other examples, the UE 115 may be configured to generate and transmit a single channel state information report. Here, the UE 115 may be configured with a channel state information report, where the UE 115 may report multiple channel state information (e.g., a channel quality indicator, a precoding matrix indicator, a rank indicator, or a combination thereof) depending on the number of activated antennas (e.g., normal power mode, low power mode).

The UE 115 may, in some examples, be configured to transmit a feedback message based on activating or deactivating one or more antennas relating to the antenna configuration. The feedback message may be an on demand feedback message. The feedback message may include an indication that a previous channel state information report is invalid based on the activating or deactivating (e.g., due to the change in the number of antennas). In some examples, the feedback message may include an indication of the normal power mode or the low power mode. The UE 115 may, in some examples, determine a format of the feedback message, and transmit the feedback message based on the format. The format may include a scheduling request format, a sounding reference signal format, a physical uplink control channel format, or a MAC-channel element format.

In some examples, the UE 115 may be configured to enable a bit indication (or multi-bit indication) in a channel state information report. The bit indication may include an indication of an on demand feedback related to the antenna configuration associated with the channel state information reporting. The base station 105 may schedule channel state information reference signals, physical channels according to the indication. For example, the base station 105 may schedule an aperiodic channel state information reporting configuration for channel state information with an aperiodic channel state information report, and the UE 115 may transmit the aperiodic channel state information report according to the aperiodic channel state information reporting configuration. In some examples, there may be a rule that the UE 115 may pause or dismiss sending on demand feedback. For example, the UE 115 may be configured with a timer (e.g., timeRestrictionForChannelMeasurements ENUMERATED {configured, notConfigured}, timeRestrictionForInterferenceMeasurements ENUMERATED {configured, notConfigured}), or a minimum or maximum time that the UE 115 may be expected to remain in a power mode. Otherwise the base station 105 may experience higher complex scheduling for the UE 115 due to a possibility of receiving frequent on demand feedbacks from the UE 115. The UE 115 may therefore, in some examples, determine a value of a channel state information report timer, and transmit a channel state information report based on the value of the channel state information report timer satisfying a threshold.

In some examples, the UE 115 may be configured to avoid determining an average of a channel quality indicator over multiple channel state information reference signal occasions or to transmit exclusively a latest channel state information report. In some examples, the UE 115 may be configured to avoid determining an average of a channel quality indicator over multiple channel state information reference signal occasions or to transmit exclusively a latest channel state information report, based on an indication. The indication may be a bit indication (e.g., field "measurementrestriction=ON"). With this, the UE 115 may not be expected to average the channel quality indicators across channel state information reference signal occasions, and only a latest channel quality indicator would be reported.

For example, the UE 115 may receive a channel state information reference signal over a channel state information reference signal occasion, and determine a channel quality indicator based on the channel state information reference signal. The UE 115 may thus transmit exclusively a channel state information report indicating the channel quality indicator associated with the channel state information reference signal occasion. In other words, whenever the UE 115 receives a channel state information reference signal is received, the UE 115 may report a channel quality indicator assuming that it will soon change its antenna configuration, and the base station 105 wouldn't worry that the channel quality indicator is somehow averaged with the previous (e.g., because the measurement restriction is ON).

The techniques employed by the described the base station 105 and the UE 115 may provide benefits and enhancements to the operation of the base station 105 and the UE 115. For example, operations performed by the base station 105 and the UE 115 may provide improvements to power saving operations. In some examples, the base station 105 and the UE 115 may support high reliability and low latency communications, among other examples, in accordance with on demand channel state information measurement and reporting with adaptive receive antennas. The base station 105 and the UE 115 may thus include features for improvements to power consumption, spectral efficiency, higher data rates and, in some examples, may promote enhanced efficiency for high reliability and low latency operations, among other benefits.

Figure 4:
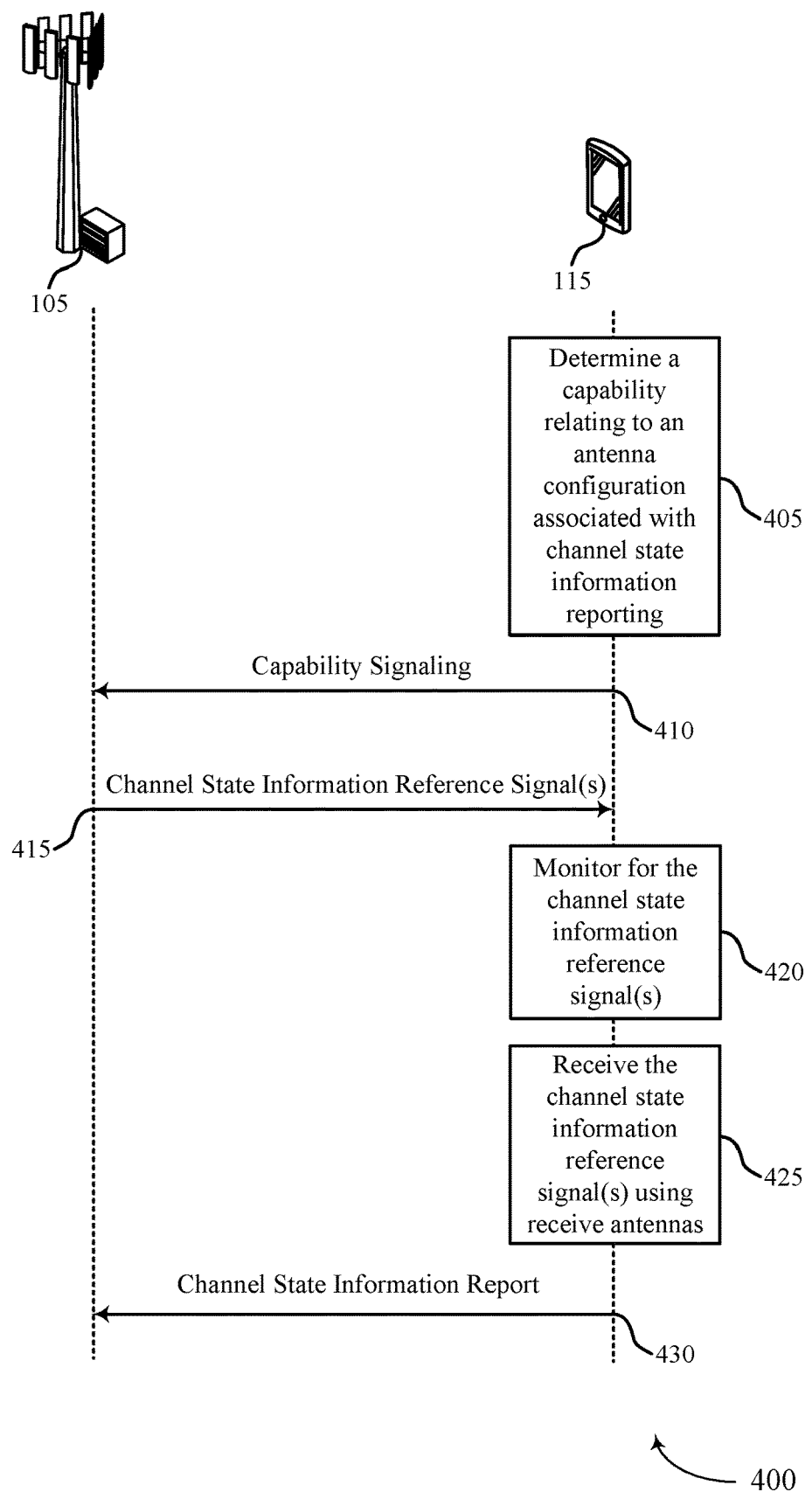
FIG. 4 illustrates an example of a process flow that supports on demand channel state information measurement and reporting with adaptive receive antennas in accordance with aspects of the present disclosure.

FIG. 4 illustrates an example of a process flow 400 that supports on demand channel state information measurement and reporting with adaptive receive antennas in accordance with aspects of the present disclosure. The process flow 400 may implement aspects of the wireless communications system 100 and 200 described with reference to FIGS. 1 and 2, respectively. For example, the process flow 400 may be based on a configuration by a base station 105 or a UE 115, and implemented by the UE 115, for reduced power consumption, and may promote low latency for wireless communications, among other benefits. The base station 105 and the UE 115 may be examples of a base station 105 and a UE 115, as described with reference to FIGS. 1 through 3. In the following description of the process flow 400, the operations between the base station 105 and the UE 115 may be transmitted in a different order than the example order shown, or the operations performed by the base station 105 and the UE 115 may be performed in different orders or at different times. Some operations may also be omitted from the process flow 400, and other operations may be added to the process flow 400.

At 405, the UE 115 may determine a capability relating to an antenna configuration associated with channel state information reporting. At 410, the UE 115 may transmit capability signaling (e.g., uplink control information) including an indication of the capability, for example, via one or more uplink physical channels. At 415, the base station 105 may transmit one or more channel state information reference signals, for example, via one or more downlink physical channels. At 420, the UE 115 may monitor for the one or more channel state information reference signal. At 425, the UE 115 may receive the one or more channel state information reference signals using receive antennas associated with the antenna configuration. At 430, the UE 115 may transmit a channel state information report in accordance with the antenna configuration associated with the channel state information reporting. The channel state information report may include one or more of a channel quality indicator, a precoding matrix indicator, a rank indicator, or a combination thereof.

In some examples, the UE 115 may select, based on the capability, a first power mode or a second power mode to receive channel state information reference signals, or physical data channels, or a combination thereof, and activate or deactivate receive antennas of the antenna configuration based on the selected power mode. The UE 115 may switch between the first power mode and the second power mode based on one or more of receiving the channel state information reference signal or receiving a channel state information trigger report. Additionally or alternatively, the UE 115 may switch between the first power mode and the second power mode based on a bandwidth part switching occasion, or within an active bandwidth part.

The UE 115 may activate the receive antennas when the first power mode is selected, where activating the receive antennas may include activating all receives antennas of the UE 115. In some examples, the UE 115 may deactivate a subset of the receive antennas when the second power mode is selected, and measure the channel state information reference signals or receive the physical data channels, or a combination thereof using the activated receive antennas. In some examples, the first power mode may correspond to a first channel state information report, and the second power mode may correspond to a second channel state information report different from the first channel state information report. Alternatively, the first power mode and the second power mode may correspond to a same channel state information report.

In some examples, the UE 115 may transmit a feedback message based on activating or deactivating the receive antennas. The feedback message may include an indication that a previous channel state information report is invalid based on the activating or deactivating. In some examples, the UE 115 may enable a bit indication in the channel state information report, the bit indication including an indication of an on demand feedback related to the antenna configuration associated with the channel state information reporting.

The operations performed by the base station 105 and the UE 115 as part of, but not limited to, process flow 400 may provide improvements to the base station 105 and the UE 115 power saving. Furthermore, the operations performed by the base station 105 and the UE 115 as part of, but not limited to, process flow 400 may provide benefits and enhancements to the operation of the base station 105 and the UE 115. For example, the described on demand channel state information measurement and reporting with adaptive receive antennas in the process flow 400 may support reduced power consumption, among other advantages.

Figure 5:
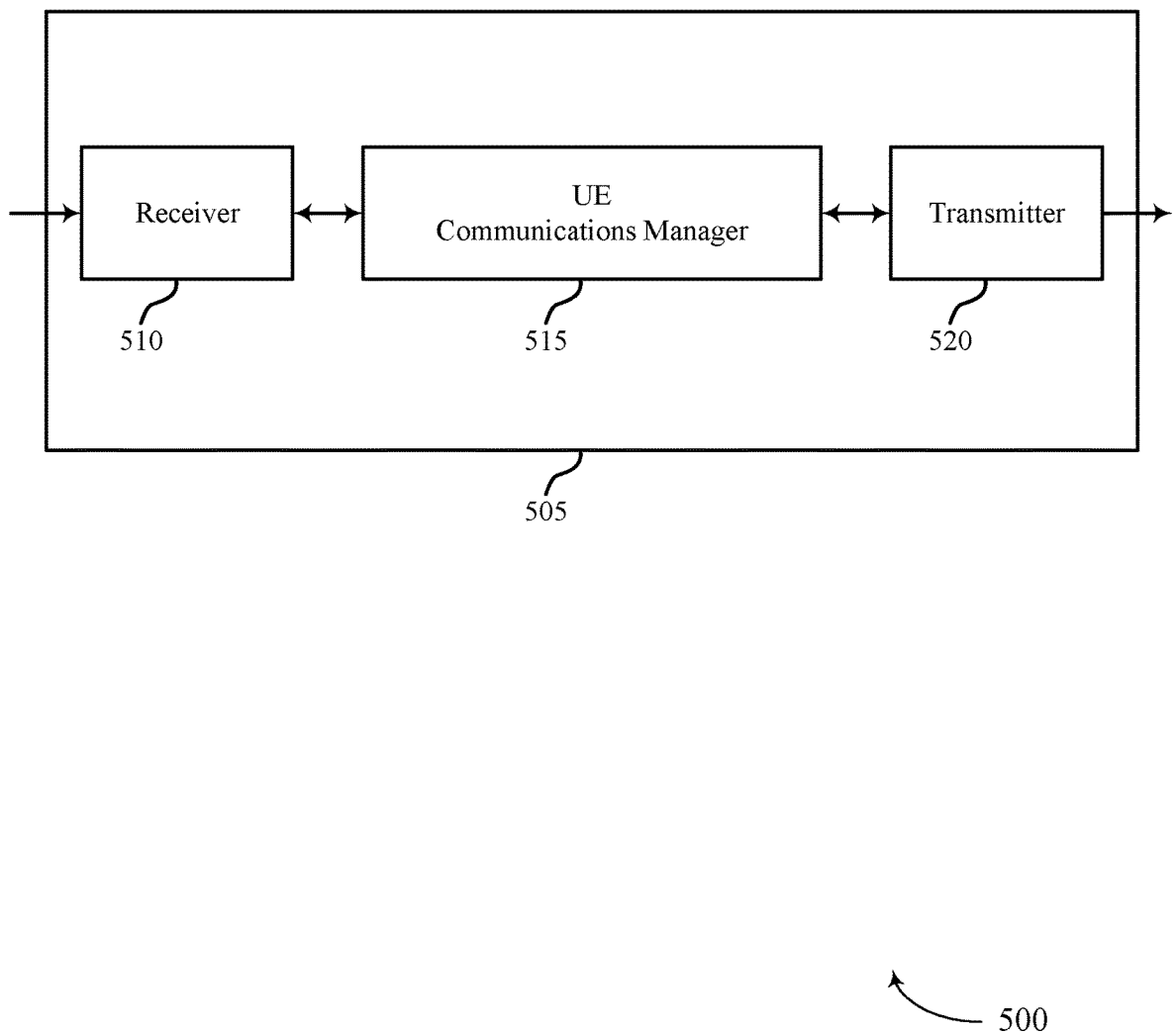
FIGS. 5 and 6 show block diagrams of devices that support on demand channel state information measurement and reporting with adaptive receive antennas in accordance with aspects of the present disclosure.

FIG. 5 shows a block diagram 500 of a device 505 that supports on demand channel state information measurement and reporting with adaptive receive antennas in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to on demand channel state information measurement and reporting with adaptive receive antennas, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may determine a capability relating to an antenna configuration associated with channel state information reporting, transmit a message including an indication of the capability, receive a channel state information reference signal using the antenna configuration, and transmit, based on the channel state information reference signal, a channel state information report in accordance with the antenna configuration associated with the channel state information reporting. The UE communications manager 515 may be an example of aspects of the UE communications manager 810 described herein.

The UE communications manager 515 may be implemented as an integrated circuit or chipset for the device 505, and the receiver 510 and the transmitter 520 may be implemented as analog components (for example, amplifiers, filters, antennas) coupled with the device 505 modem to enable wireless transmission and reception The actions performed by the UE communications manager 515 as described herein may be implemented to realize one or more potential advantages. At least one implementation may enable the UE communications manager 515 to operate using an antenna configuration based on a selected power mode. Based on implementing the operating, one or more processors of the device 505 (for example, processor(s) controlling or incorporated with the UE communications manager 515) may promote improvements to power saving operations, spectral efficiency, higher data rates and, in some examples, may promote enhanced efficiency for high reliability and low latency operations, among other benefits by supporting activating or deactivating receive antennas based on a selected power mode.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
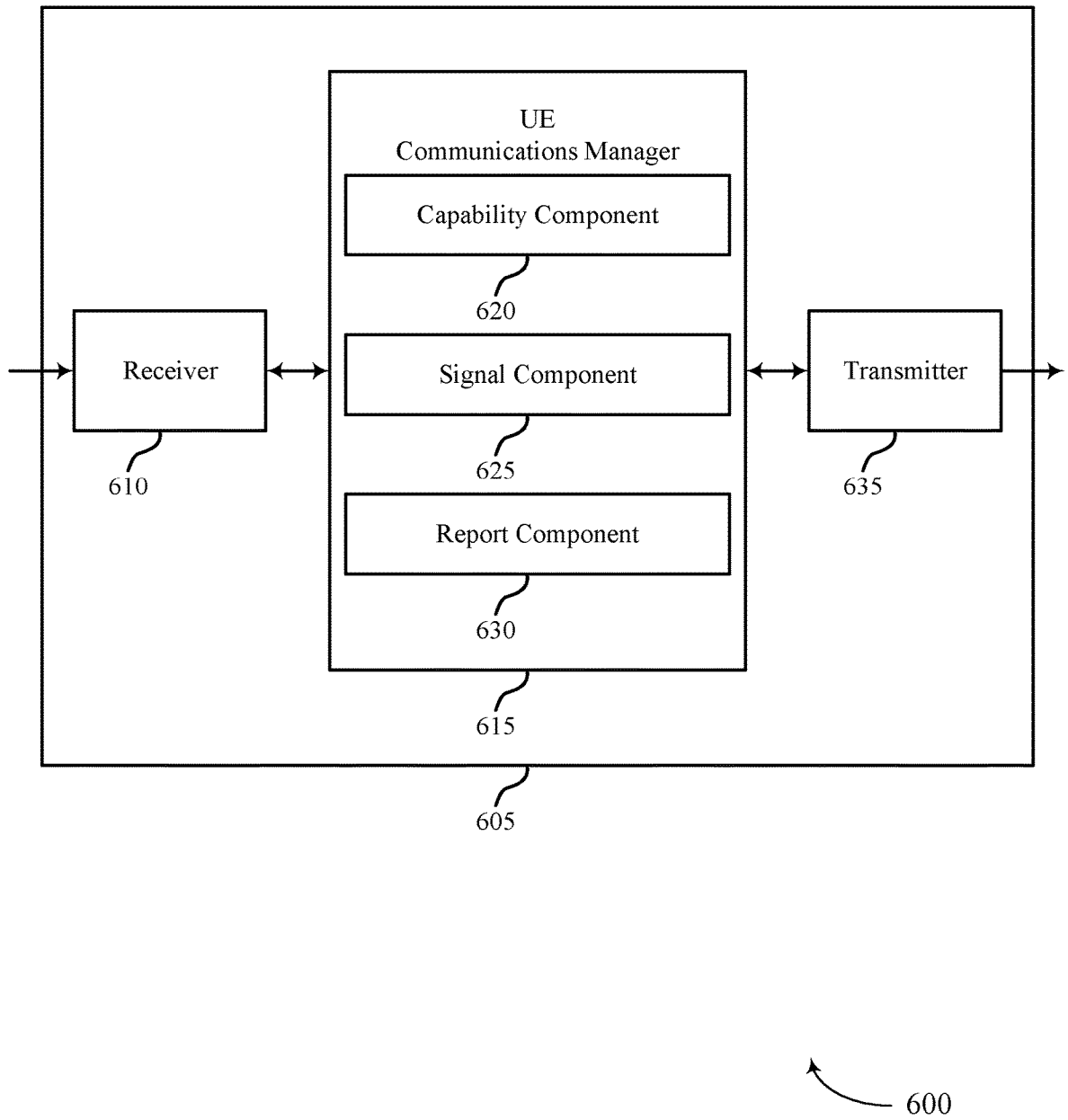

FIG. 6 shows a block diagram 600 of a device 605 that supports on demand channel state information measurement and reporting with adaptive receive antennas in accordance with aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to on demand channel state information measurement and reporting with adaptive receive antennas, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a capability component 620, a signal component 625, and a report component 630. The UE communications manager 615 may be an example of aspects of the UE communications manager 810 described herein.

The capability component 620 may determine a capability relating to an antenna configuration associated with channel state information reporting and transmit a message including an indication of the capability. The signal component 625 may receive a channel state information reference signal using the antenna configuration. The report component 630 may transmit, based on the channel state information reference signal, a channel state information report in accordance with the antenna configuration associated with the channel state information reporting.

The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a single antenna or a set of antennas.

Figure 7:
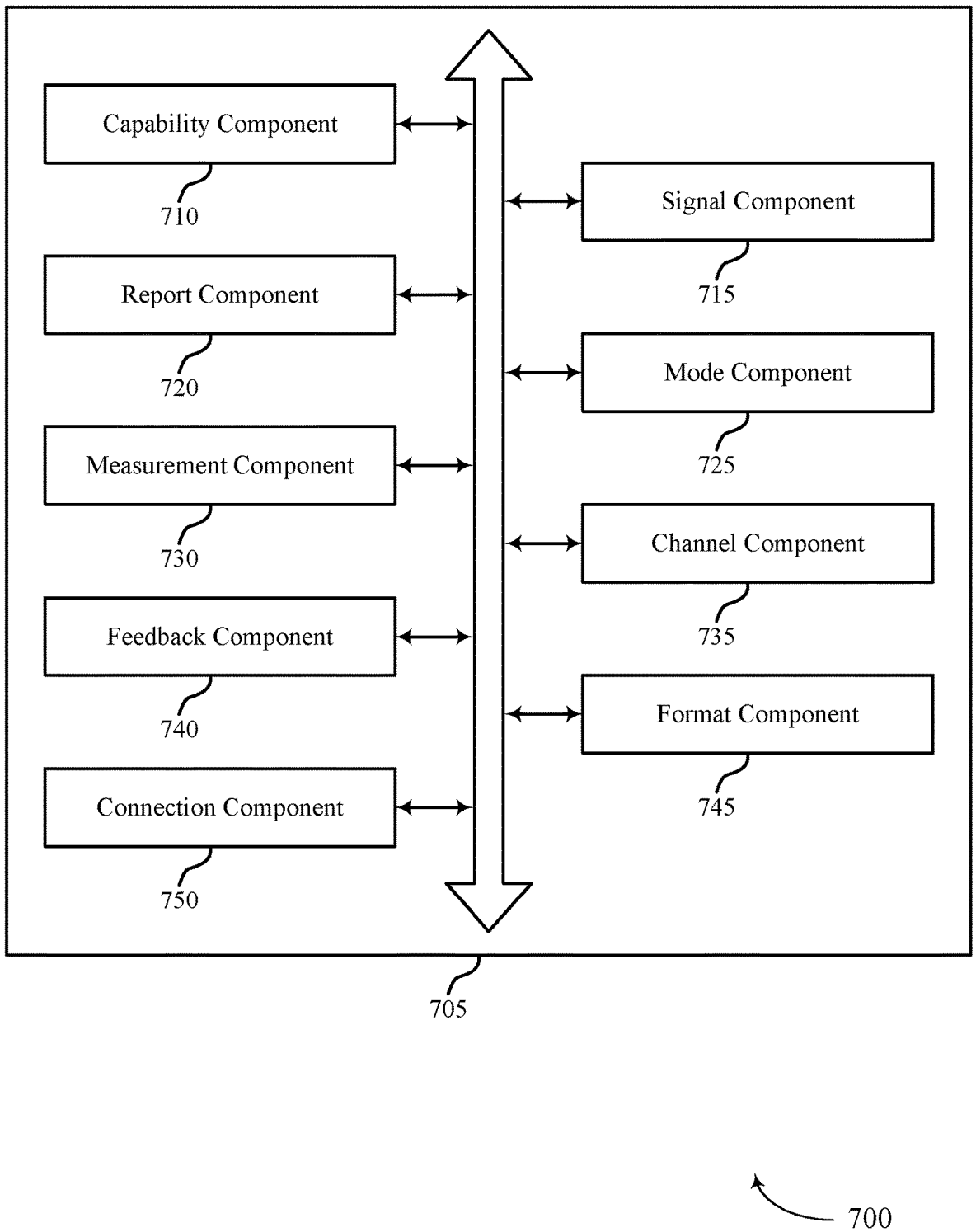
FIG. 7 shows a block diagram of a communications manager that supports on demand channel state information measurement and reporting with adaptive receive antennas in accordance with aspects of the present disclosure.

FIG. 7 shows a block diagram 700 of a UE communications manager 705 that supports on demand channel state information measurement and reporting with adaptive receive antennas in accordance with aspects of the present disclosure. The UE communications manager 705 may be an example of aspects of a UE communications manager 515, a UE communications manager 615, or a UE communications manager 810 described herein. The UE communications manager 705 may include a capability component 710, a signal component 715, a report component 720, a mode component 725, a measurement component 730, a channel component 735, a feedback component 740, a format component 745, and a connection component 750. Each of these components may communicate, directly or indirectly, with one another (e.g., via one or more buses).

The capability component 710 may determine a capability relating to an antenna configuration associated with channel state information reporting. In some examples, the capability component 710 may transmit a message including an indication of the capability. In some examples, the capability component 710 may receive a second message including a second indication of one or more of an aperiodic channel state information reporting configuration for channel state information with an aperiodic channel state information report. In some examples, the capability component 710 may transmit the aperiodic channel state information report according to the aperiodic channel state information reporting configuration. In some examples, the capability component 710 may receive a second message including a second indication of one or more to avoid determining an average of a channel quality indicator over a set of channel state information reference signal occasions or to transmit exclusively a latest channel state information report.

The signal component 715 may receive a channel state information reference signal using the antenna configuration. The report component 720 may transmit, based on the channel state information reference signal, a channel state information report in accordance with the antenna configuration associated with the channel state information reporting.

In some examples, the report component 720 may transmit the channel state information report based on the measuring. In some examples, the report component 720 may transmit the channel state information report based on the receiving. In some examples, the report component 720 may determine a value of a channel state information report timer. In some examples, the report component 720 may transmit a channel state information report based on the value of the channel state information report timer satisfying a threshold. In some examples, the report component 720 may receive a channel state information reference signal over a channel state information reference signal occasion. In some examples, the report component 720 may determine a channel quality indicator based on the channel state information reference signal. In some examples, the report component 720 may transmit exclusively a channel state information report indicating the channel quality indicator associated with the channel state information reference signal occasion.

The mode component 725 may select, based on the capability, a first power mode or a second power mode to receive channel state information reference signals, or physical data channels, or a combination thereof. In some examples, the mode component 725 may activate or deactivating receive antennas of the antenna configuration based on the selected power mode. In some examples, the mode component 725 may select the first power mode or the second power mode, or activating or deactivating the receive antennas is based on one or more of receiving the channel state information reference signal or receiving a channel state information trigger report. In some examples, the mode component 725 may switch between the first power mode and the second power mode based on one or more of receiving the channel state information reference signal or receiving a channel state information trigger report. In some examples, the mode component 725 may switch between the first power mode and the second power mode based on a bandwidth part switching occasion. In some examples, the mode component 725 may switch between the first power mode and the second power mode within a bandwidth part. In some examples, the mode component 725 may select activating the receive antennas when the first power mode is selected, where activating the receive antennas includes activating all receives antennas.

In some examples, the mode component 725 may deactivate a subset of the receive antennas when the second power mode is selected. In some examples, the mode component 725 may include, in the same channel state information report, one or more of a channel quality indicator, a precoding matrix indicator, a rank indicator, or a combination thereof based on the receive antennas. In some cases, the first power mode corresponds to a first channel state information report, and the second power mode corresponds to a second channel state information report different from the first channel state information report. In some cases, the first power mode and the second power mode correspond to a same channel state information report.

The measurement component 730 may measure the channel state information reference signals or receiving the physical data channels, or a combination thereof using the activated receive antennas. In some examples, the measurement component 730 may measure the channel state information reference signals using the receive antennas. The channel component 735 may receive the physical data channels using the receive antennas, where the physical data channels includes physical downlink shared channels.

The feedback component 740 may transmit a feedback message based on activating or deactivating the receive antennas. In some examples, the feedback component 740 may enable a bit indication in a channel state information report, the bit indication including an indication of an on demand feedback related to the antenna configuration associated with the channel state information reporting. In some cases, the feedback message includes an indication that a previous channel state information report is invalid based on the activating or deactivating. In some cases, the feedback message includes an indication of the first power mode or the second power mode.

The format component 745 may determine a format of a feedback message. In some examples, the format component 745 may transmit the feedback message according to the format. In some cases, the feedback message is an on demand feedback message. In some cases, the format includes a scheduling request format. In some cases, the format includes a sounding reference signal format. In some cases, the format includes a physical uplink control channel format. In some cases, the format includes a MAC-channel element format. The connection component 750 may establish a connection with a base station, where determining the capability is based on the connection. In some examples, the connection component 750 may transmit the message including the indication of the capability to the base station.

Figure 8:
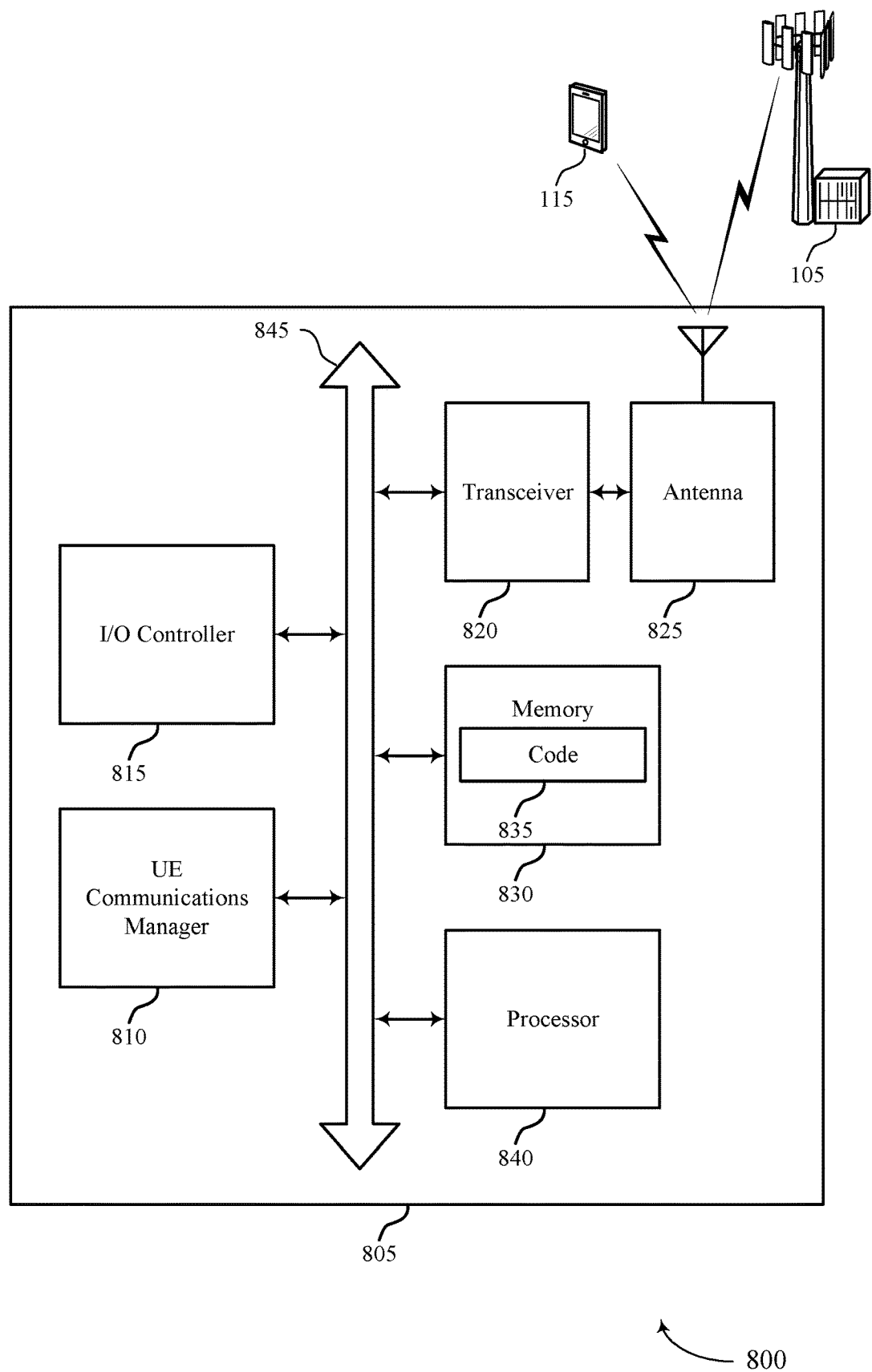
FIG. 8 shows a diagram of a system including a device that supports on demand channel state information measurement and reporting with adaptive receive antennas in accordance with aspects of the present disclosure.

FIG. 8 shows a diagram of a system 800 including a device 805 that supports on demand channel state information measurement and reporting with adaptive receive antennas in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may determine a capability relating to an antenna configuration associated with channel state information reporting, transmit a message including an indication of the capability, receive a channel state information reference signal using the antenna configuration, and transmit, based on the channel state information reference signal, a channel state information report in accordance with the antenna configuration associated with the channel state information reporting.

At least one implementation may enable the UE communications manager 810 to operate using an antenna configuration based on a selected power mode. Based on implementing the operating, one or more processors of the device 805 (for example, processor(s) controlling or incorporated with the UE communications manager 810) may promote improvements to power consumption, spectral efficiency, higher data rates and, in some examples, may promote enhanced efficiency for high reliability and low latency operations, among other benefits by supporting activating or deactivating receive antennas based on a selected power mode.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting on demand channel state information measurement and reporting with adaptive receive antennas).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
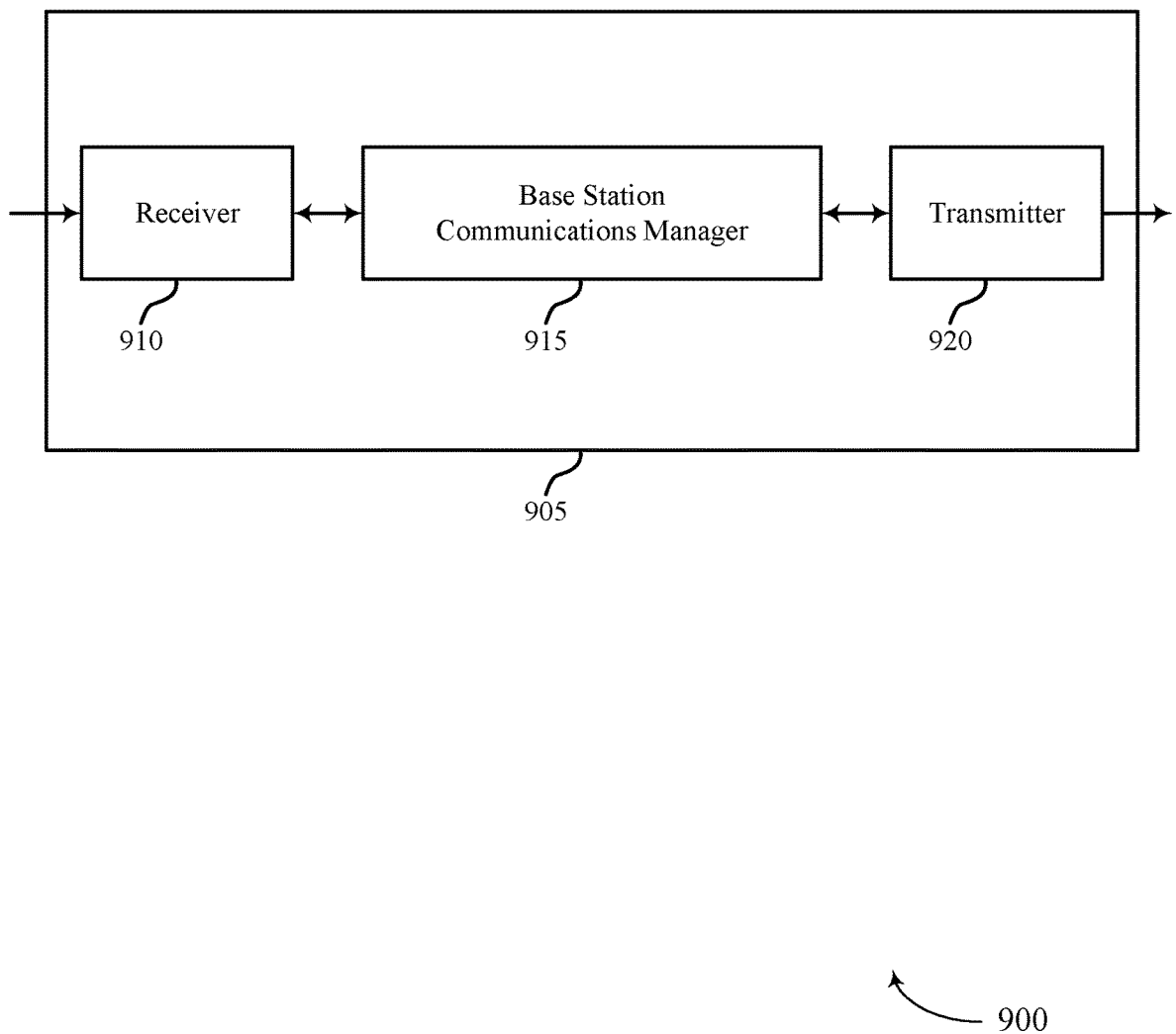
FIGS. 9 and 10 show block diagrams of devices that support on demand channel state information measurement and reporting with adaptive receive antennas in accordance with aspects of the present disclosure.

FIG. 9 shows a block diagram 900 of a device 905 that supports on demand channel state information measurement and reporting with adaptive receive antennas in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to on demand channel state information measurement and reporting with adaptive receive antennas, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may receive a message including an indication of a capability relating to an antenna configuration associated with channel state information reporting, transmit a channel state information reference signal based on the capability, and receive, based on the channel state information reference signal, a channel state information report in accordance with the antenna configuration associated with the channel state information reporting. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
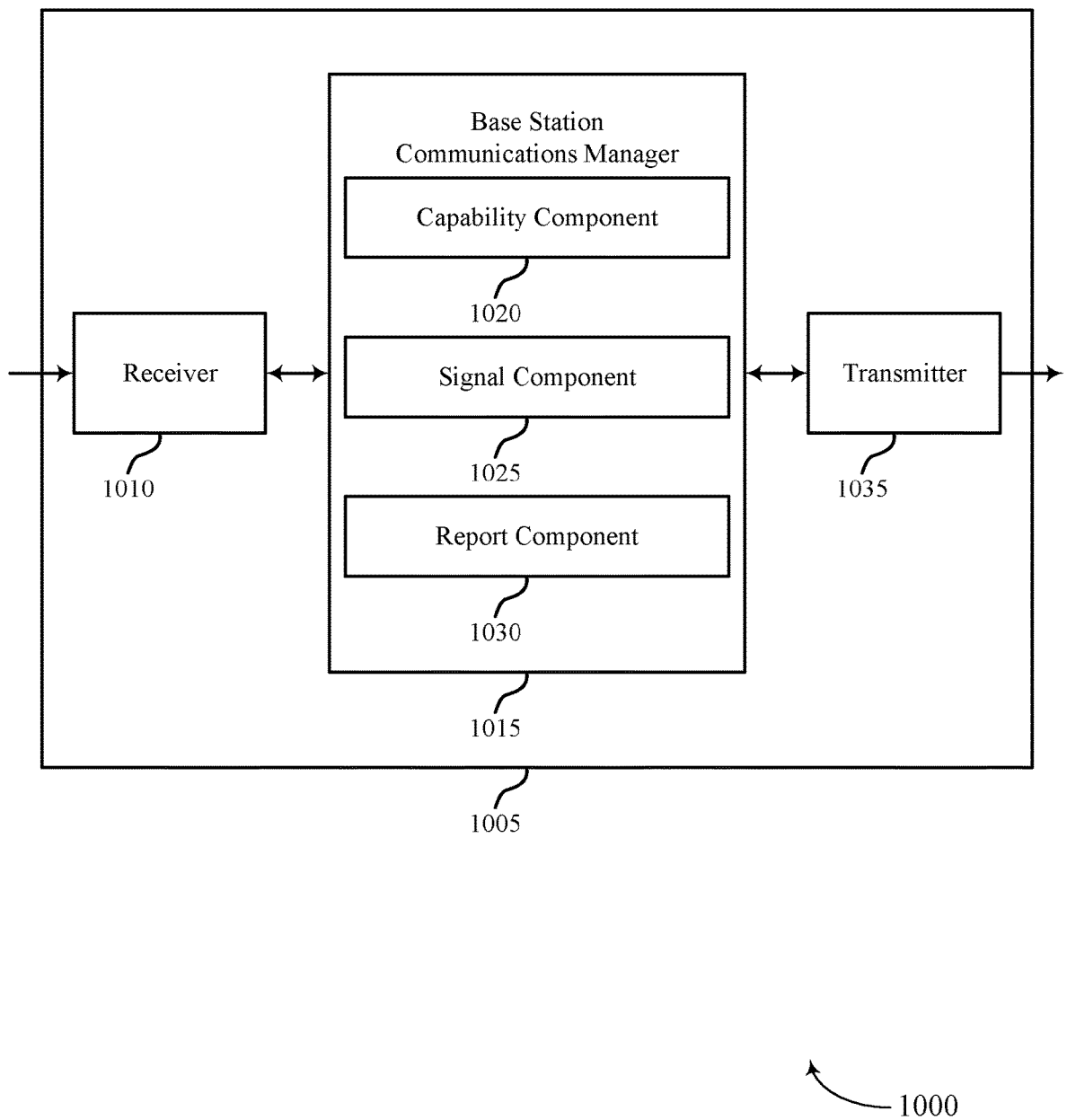

FIG. 10 shows a block diagram 1000 of a device 1005 that supports on demand channel state information measurement and reporting with adaptive receive antennas in accordance with aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to on demand channel state information measurement and reporting with adaptive receive antennas, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a capability component 1020, a signal component 1025, and a report component 1030. The base station communications manager 1015 may be an example of aspects of the base station communications manager 1210 described herein.

The capability component 1020 may receive a message including an indication of a capability relating to an antenna configuration associated with channel state information reporting. The signal component 1025 may transmit a channel state information reference signal based on the capability. The report component 1030 may receive, based on the channel state information reference signal, a channel state information report in accordance with the antenna configuration associated with the channel state information reporting.

The transmitter 1035 may transmit signals generated by other components of the device 1005. In some examples, the transmitter 1035 may be collocated with a receiver 1010 in a transceiver component. For example, the transmitter 1035 may be an example of aspects of the transceiver 1220 described with reference to FIG. 12. The transmitter 1035 may utilize a single antenna or a set of antennas.

Figure 11:
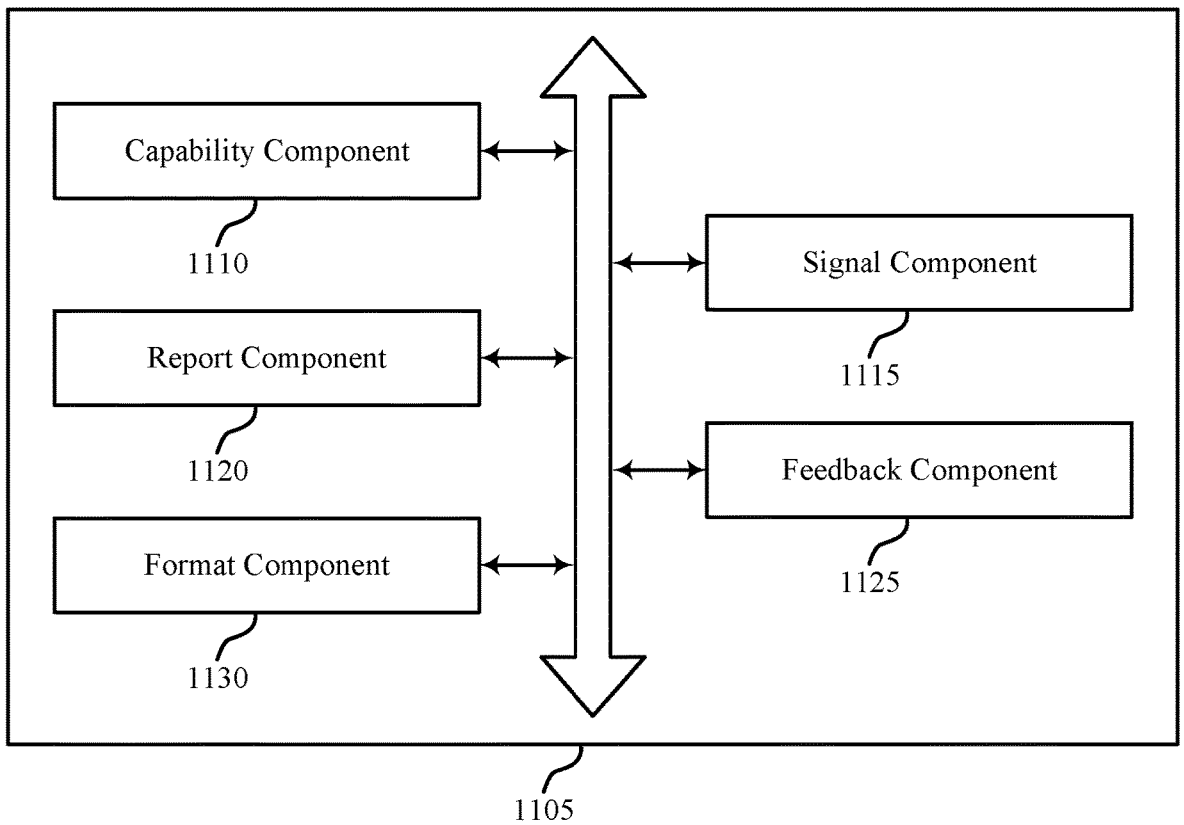
FIG. 11 shows a block diagram of a communications manager that supports on demand channel state information measurement and reporting with adaptive receive antennas in accordance with aspects of the present disclosure.

FIG. 11 shows a block diagram 1100 of a base station communications manager 1105 that supports on demand channel state information measurement and reporting with adaptive receive antennas in accordance with aspects of the present disclosure. The base station communications manager 1105 may be an example of aspects of a base station communications manager 915, a base station communications manager 1015, or a base station communications manager 1210 described herein. The base station communications manager 1105 may include a capability component 1110, a signal component 1115, a report component 1120, a feedback component 1125, and a format component 1130. Each of these components may communicate, directly or indirectly, with one another (e.g., via one or more buses).

The capability component 1110 may receive a message including an indication of a capability relating to an antenna configuration associated with channel state information reporting. The signal component 1115 may transmit a channel state information reference signal based on the capability. The report component 1120 may receive, based on the channel state information reference signal, a channel state information report in accordance with the antenna configuration associated with the channel state information reporting.

The feedback component 1125 may identify a bit indication in the channel state information report, the bit indication including an indication of an on demand feedback related to the antenna configuration associated with the channel state information reporting. In some examples, the feedback component 1125 may determine one or more of the channel state information reporting or the antenna configuration associated with the channel state information reporting based on the on demand feedback. In some examples, the feedback component 1125 may receive a feedback message based on the on demand feedback. In some cases, the feedback message includes an indication that a previous channel state information report is invalid. In some cases, the feedback message includes an indication of a first power mode or a second power mode. The format component 1130 may determine a format of the feedback message, where receiving the feedback message is based on the format. In some cases, the feedback message is an on demand feedback message. In some cases, the format includes a scheduling request format. In some cases, the format includes a sounding reference signal format. In some cases, the format includes a physical uplink control channel format. In some cases, the format includes a MAC-channel element format.

Figure 12:
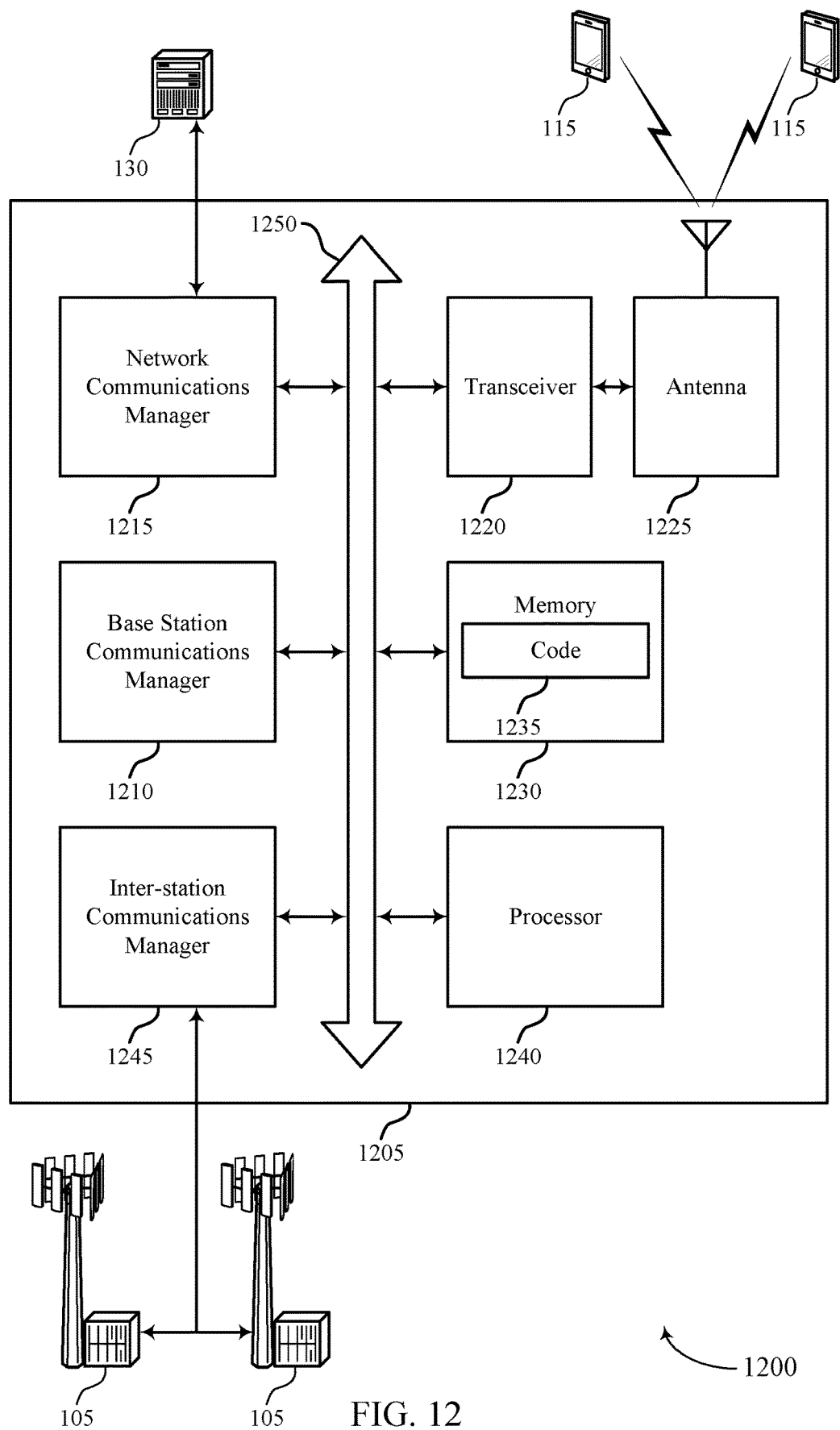
FIG. 12 shows a diagram of a system including a device that supports on demand channel state information measurement and reporting with adaptive receive antennas in accordance with aspects of the present disclosure.

FIG. 12 shows a diagram of a system 1200 including a device 1205 that supports on demand channel state information measurement and reporting with adaptive receive antennas in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may receive a message including an indication of a capability relating to an antenna configuration associated with channel state information reporting, transmit a channel state information reference signal based on the capability, and receive, based on the channel state information reference signal, a channel state information report in accordance with the antenna configuration associated with the channel state information reporting.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases, the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting on demand channel state information measurement and reporting with adaptive receive antennas).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
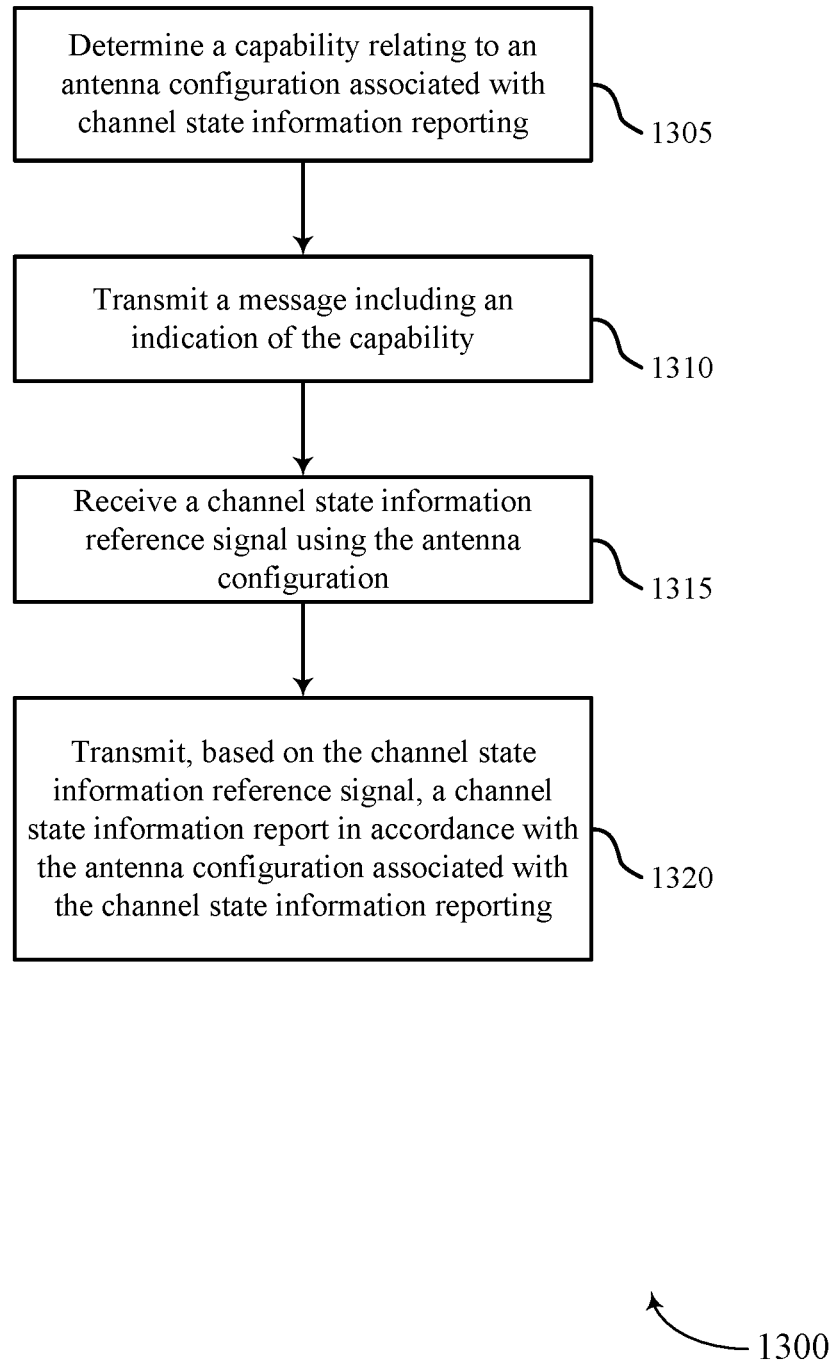
FIGS. 13 through 17 show flowcharts illustrating methods that support on demand channel state information measurement and reporting with adaptive receive antennas in accordance with aspects of the present disclosure.

FIG. 13 shows a flowchart illustrating a method 1300 that supports on demand channel state information measurement and reporting with adaptive receive antennas in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may determine a capability relating to an antenna configuration associated with channel state information reporting. The operations of 1305 may be performed according to the methods described herein. In some examples, aspects of the operations of 1305 may be performed by a capability component as described with reference to FIGS. 5 through 8.

At 1310, the UE may transmit a message including an indication of the capability. The operations of 1310 may be performed according to the methods described herein. In some examples, aspects of the operations of 1310 may be performed by a capability component as described with reference to FIGS. 5 through 8.

At 1315, the UE may receive a channel state information reference signal using the antenna configuration. The operations of 1315 may be performed according to the methods described herein. In some examples, aspects of the operations of 1315 may be performed by a signal component as described with reference to FIGS. 5 through 8.

At 1320, the UE may transmit, based on the channel state information reference signal, a channel state information report in accordance with the antenna configuration associated with the channel state information reporting. The operations of 1320 may be performed according to the methods described herein. In some examples, aspects of the operations of 1320 may be performed by a report component as described with reference to FIGS. 5 through 8.

Figure 14:
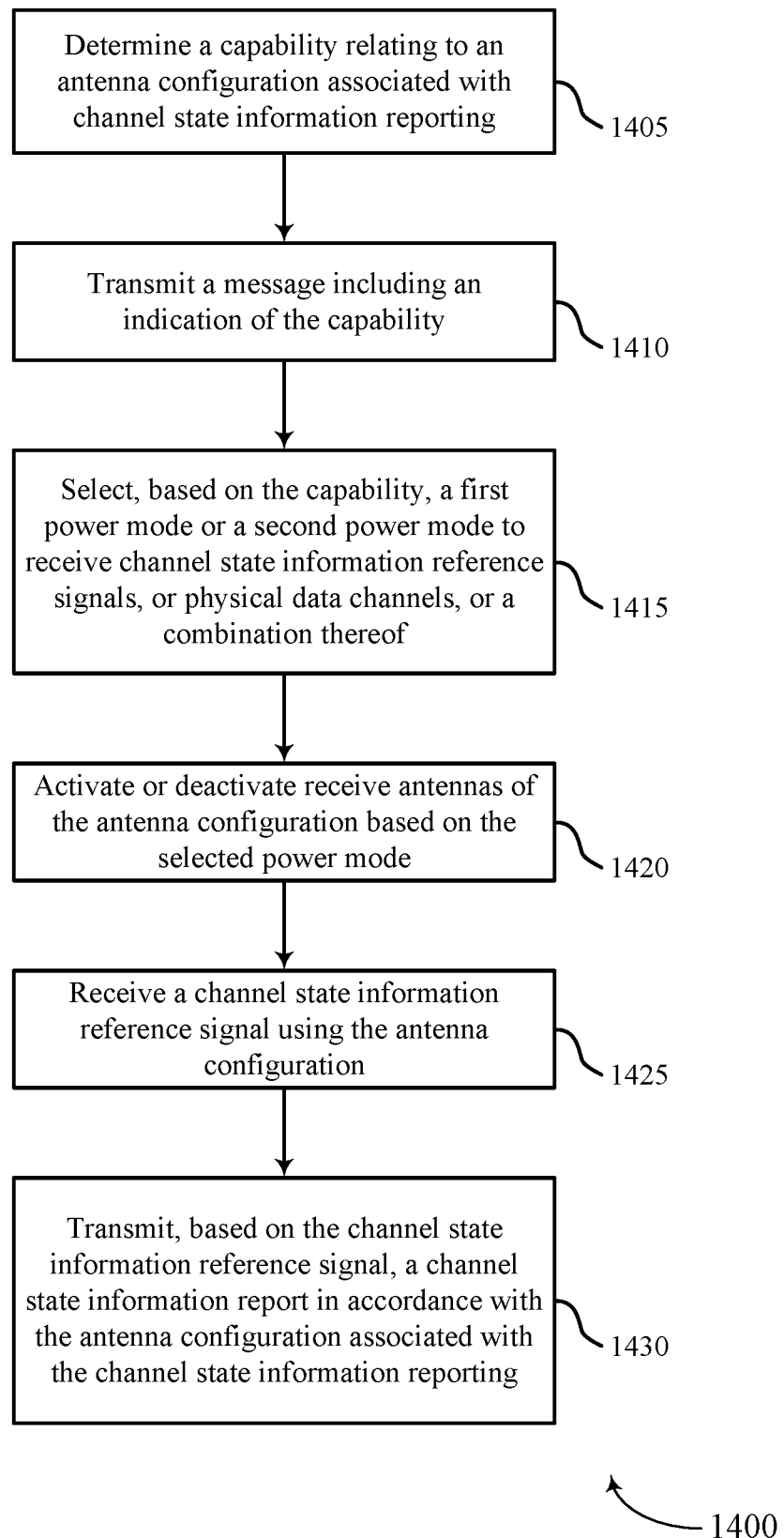

FIG. 14 shows a flowchart illustrating a method 1400 that supports on demand channel state information measurement and reporting with adaptive receive antennas in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may determine a capability relating to an antenna configuration associated with channel state information reporting. The operations of 1405 may be performed according to the methods described herein. In some examples, aspects of the operations of 1405 may be performed by a capability component as described with reference to FIGS. 5 through 8.

At 1410, the UE may transmit a message including an indication of the capability. The operations of 1410 may be performed according to the methods described herein. In some examples, aspects of the operations of 1410 may be performed by a capability component as described with reference to FIGS. 5 through 8.

At 1415, the UE may select, based on the capability, a first power mode or a second power mode to receive channel state information reference signals, or physical data channels, or a combination thereof. The operations of 1415 may be performed according to the methods described herein. In some examples, aspects of the operations of 1415 may be performed by a mode component as described with reference to FIGS. 5 through 8.

At 1420, the UE may activate or deactivate receive antennas of the antenna configuration based on the selected power mode. The operations of 1420 may be performed according to the methods described herein. In some examples, aspects of the operations of 1420 may be performed by a mode component as described with reference to FIGS. 5 through 8.

At 1425, the UE may receive a channel state information reference signal using the antenna configuration. The operations of 1425 may be performed according to the methods described herein. In some examples, aspects of the operations of 1425 may be performed by a signal component as described with reference to FIGS. 5 through 8.

At 1430, the UE may transmit, based on the channel state information reference signal, a channel state information report in accordance with the antenna configuration associated with the channel state information reporting. The operations of 1430 may be performed according to the methods described herein. In some examples, aspects of the operations of 1430 may be performed by a report component as described with reference to FIGS. 5 through 8.

Figure 15:
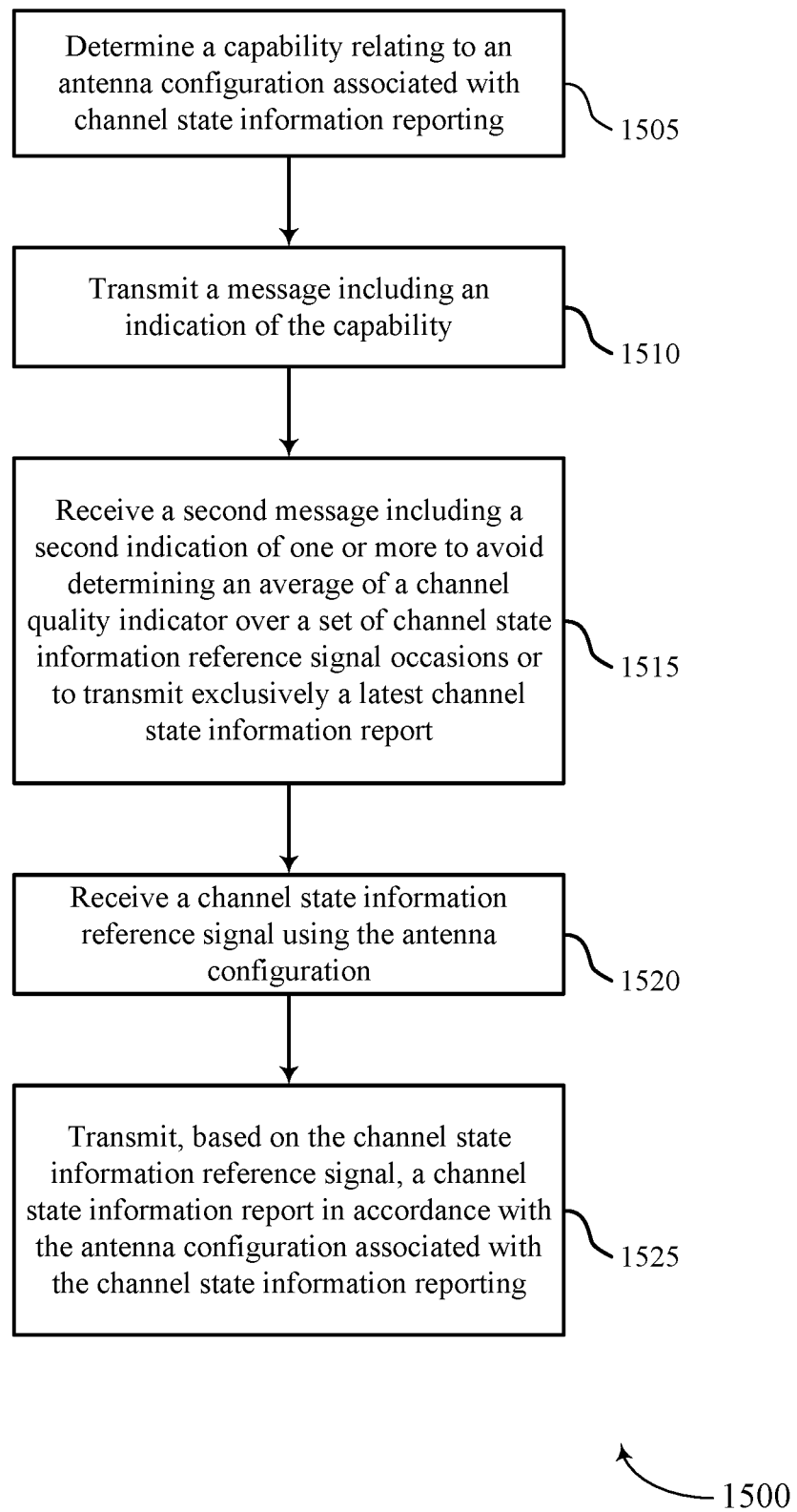

FIG. 15 shows a flowchart illustrating a method 1500 that supports on demand channel state information measurement and reporting with adaptive receive antennas in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may determine a capability relating to an antenna configuration associated with channel state information reporting. The operations of 1505 may be performed according to the methods described herein. In some examples, aspects of the operations of 1505 may be performed by a capability component as described with reference to FIGS. 5 through 8.

At 1510, the UE may transmit a message including an indication of the capability. The operations of 1510 may be performed according to the methods described herein. In some examples, aspects of the operations of 1510 may be performed by a capability component as described with reference to FIGS. 5 through 8.

At 1515, the UE may receive a second message including a second indication of one or more to avoid determining an average of a channel quality indicator over a set of channel state information reference signal occasions or to transmit exclusively a latest channel state information report. The operations of 1515 may be performed according to the methods described herein. In some examples, aspects of the operations of 1515 may be performed by a capability component as described with reference to FIGS. 5 through 8.

At 1520, the UE may receive a channel state information reference signal using the antenna configuration. The operations of 1520 may be performed according to the methods described herein. In some examples, aspects of the operations of 1520 may be performed by a signal component as described with reference to FIGS. 5 through 8.

At 1525, the UE may transmit, based on the channel state information reference signal, a channel state information report in accordance with the antenna configuration associated with the channel state information reporting. The operations of 1525 may be performed according to the methods described herein. In some examples, aspects of the operations of 1525 may be performed by a report component as described with reference to FIGS. 5 through 8.

Figure 16:
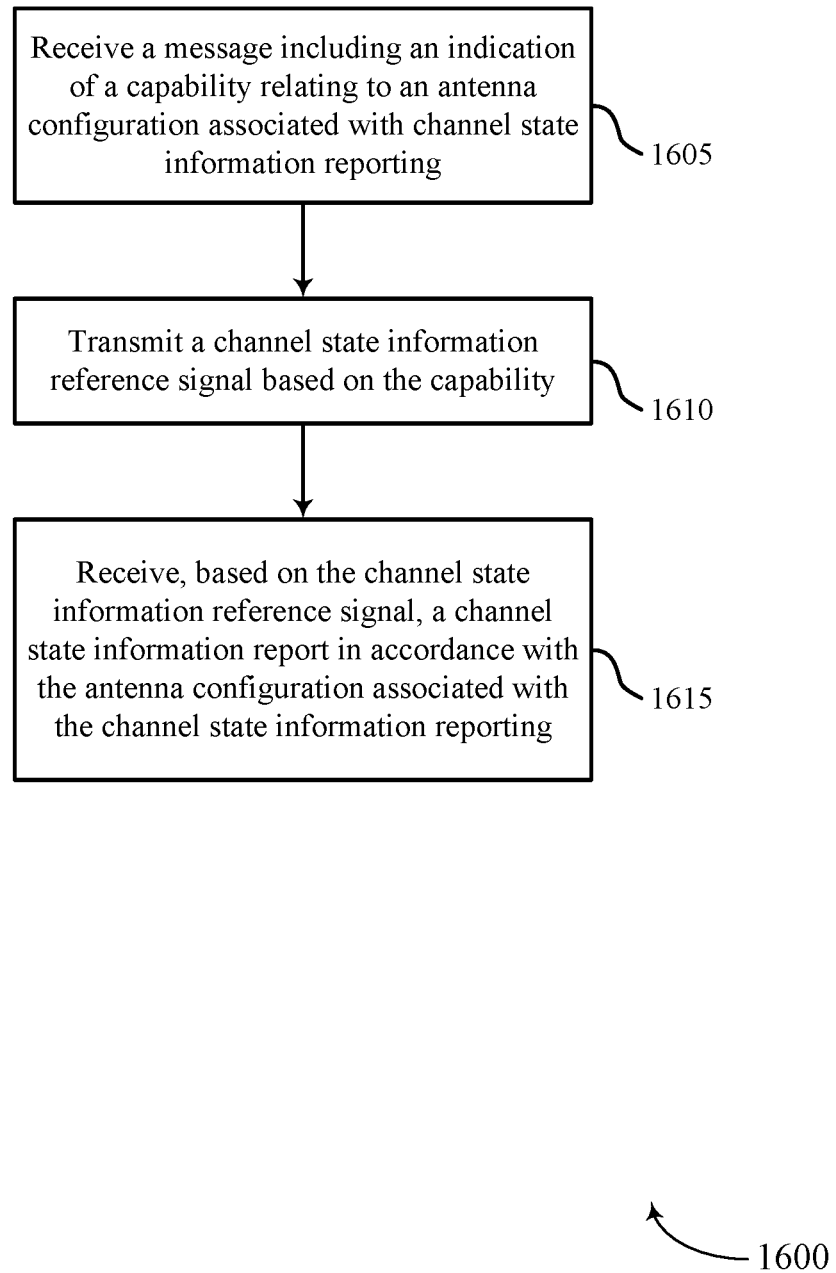

FIG. 16 shows a flowchart illustrating a method 1600 that supports on demand channel state information measurement and reporting with adaptive receive antennas in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive a message including an indication of a capability relating to an antenna configuration associated with channel state information reporting. The operations of 1605 may be performed according to the methods described herein. In some examples, aspects of the operations of 1605 may be performed by a capability component as described with reference to FIGS. 9 through 12.

At 1610, the base station may transmit a channel state information reference signal based on the capability. The operations of 1610 may be performed according to the methods described herein. In some examples, aspects of the operations of 1610 may be performed by a signal component as described with reference to FIGS. 9 through 12.

At 1615, the base station may receive, based on the channel state information reference signal, a channel state information report in accordance with the antenna configuration associated with the channel state information reporting. The operations of 1615 may be performed according to the methods described herein. In some examples, aspects of the operations of 1615 may be performed by a report component as described with reference to FIGS. 9 through 12.

Figure 17:
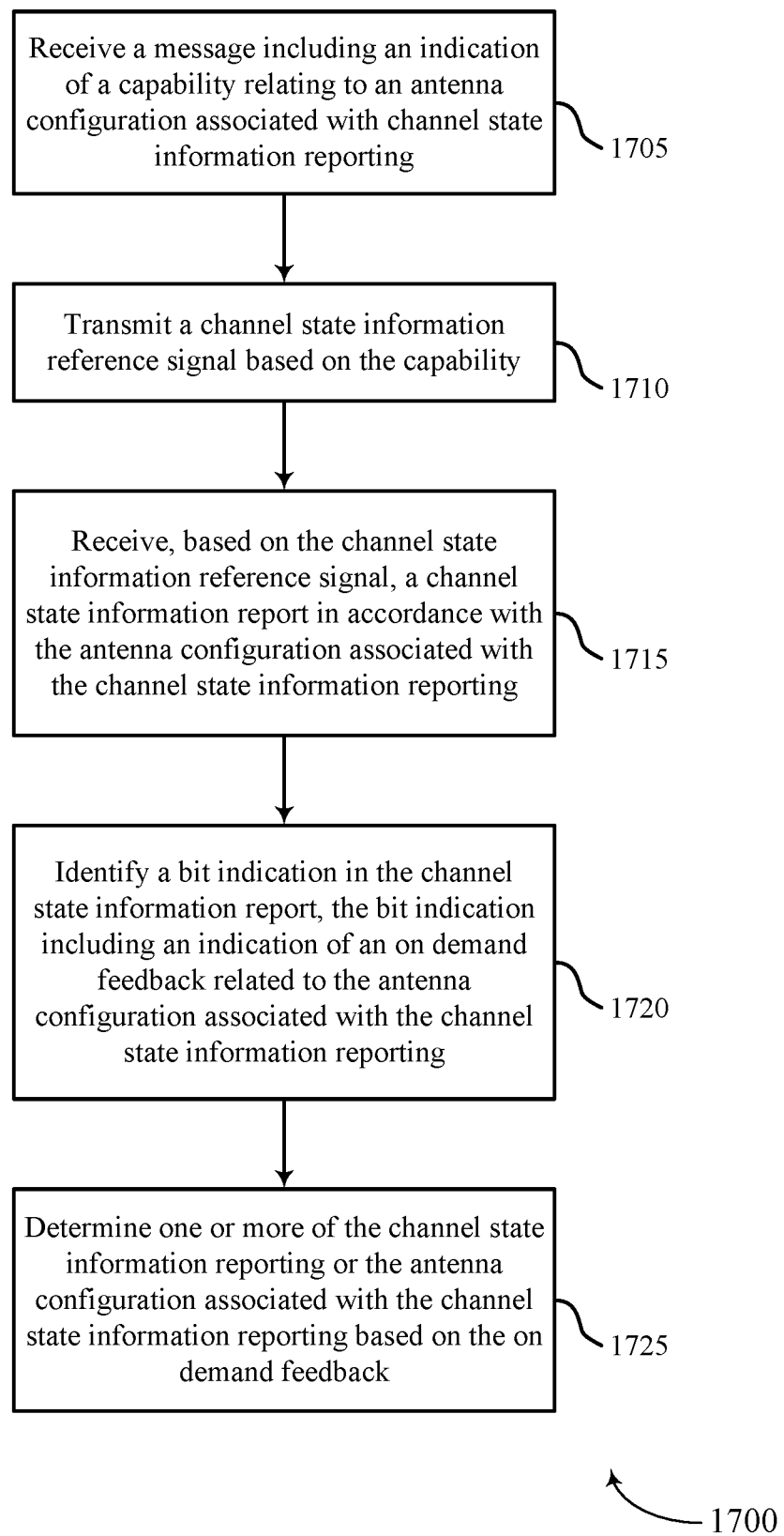

FIG. 17 shows a flowchart illustrating a method 1700 that supports on demand channel state information measurement and reporting with adaptive receive antennas in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive a message including an indication of a capability relating to an antenna configuration associated with channel state information reporting. The operations of 1705 may be performed according to the methods described herein. In some examples, aspects of the operations of 1705 may be performed by a capability component as described with reference to FIGS. 9 through 12.

At 1710, the base station may transmit a channel state information reference signal based on the capability. The operations of 1710 may be performed according to the methods described herein. In some examples, aspects of the operations of 1710 may be performed by a signal component as described with reference to FIGS. 9 through 12.

At 1715, the base station may receive, based on the channel state information reference signal, a channel state information report in accordance with the antenna configuration associated with the channel state information reporting. The operations of 1715 may be performed according to the methods described herein. In some examples, aspects of the operations of 1715 may be performed by a report component as described with reference to FIGS. 9 through 12.

At 1720, the base station may identify a bit indication in the channel state information report, the bit indication including an indication of an on demand feedback related to the antenna configuration associated with the channel state information reporting. The operations of 1720 may be performed according to the methods described herein. In some examples, aspects of the operations of 1720 may be performed by a feedback component as described with reference to FIGS. 9 through 12.

At 1725, the base station may determine one or more of the channel state information reporting or the antenna configuration associated with the channel state information reporting based on the on demand feedback. The operations of 1725 may be performed according to the methods described herein. In some examples, aspects of the operations of 1725 may be performed by a feedback component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processor,
memory coupled with the processor; and
instructions stored in the memory and executable by the processor to cause the apparatus to:
select, based at least in part on a capability relating to an antenna configuration associated with channel state information reporting, a first power mode or a second power mode to receive channel state information reference signals, or physical data channels, or a combination thereof;
transmit a message comprising an indication of the capability;
receive, in accordance with the selected power mode, a channel state information reference signal using the antenna configuration; and
transmit, based at least in part on the channel state information reference signal, a channel state information report in accordance with the selected power mode and the antenna configuration associated with the channel state information reporting.

2. The apparatus of claim 1, wherein the instructions are further executable by the processor to cause the apparatus to:
activate or deactivate receive antennas of the antenna configuration based at least in part on the selected power mode.

3. The apparatus of claim 2, wherein the instructions to select the first power mode or the second power mode, or activate or deactivate the receive antennas are further executable by the processor based at least in part on one or more of receiving the channel state information reference signal or receiving a channel state information trigger report.

4. The apparatus of claim 2, wherein the instructions are further executable by the processor to cause the apparatus to:
switch between the first power mode and the second power mode based at least in part on one or more of receiving the channel state information reference signal or receiving a channel state information trigger report.

5. The apparatus of claim 2, wherein the instructions are further executable by the processor to cause the apparatus to:
switch between the first power mode and the second power mode based at least in part on a bandwidth part switching occasion.

6. The apparatus of claim 2, wherein the instructions are further executable by the processor to cause the apparatus to:
switch between the first power mode and the second power mode within a bandwidth part.

7. The apparatus of claim 2, wherein the instructions are further executable by the processor to cause the apparatus to:
activate the receive antennas when the first power mode is selected, wherein the instructions to activate the receive antennas are further executable by the processor to cause the apparatus to activate all receives antennas.

8. The apparatus of claim 2, wherein the instructions are further executable by the processor to cause the apparatus to:
deactivate a subset of the receive antennas when the second power mode is selected; and
measure the channel state information reference signals or receive the physical data channels, or a combination thereof, using the activated receive antennas.

9. The apparatus of claim 2, wherein the instructions are further executable by the processor to cause the apparatus to:
receive the physical data channels using the receive antennas, wherein the physical data channels comprise physical downlink shared channels; and
transmit the channel state information report based at least in part on the receiving.

10. The apparatus of claim 2, wherein the first power mode corresponds to a first channel state information report, and the second power mode corresponds to a second channel state information report different from the first channel state information report.

11. The apparatus of claim 2, wherein the first power mode and the second power mode correspond to a same channel state information report.

12. The apparatus of claim 11, wherein the instructions are further executable by the processor to cause the apparatus to:
include, in the same channel state information report, one or more of a channel quality indicator, a precoding matrix indicator, a rank indicator, or a combination thereof based at least in part on the receive antennas.

13. The apparatus of claim 2, wherein the instructions are further executable by the processor to cause the apparatus to:
transmit a feedback message based at least in part on activating or deactivating the receive antennas.

14. The apparatus of claim 13, wherein the feedback message comprises an indication that a previous channel state information report is invalid based at least in part on the activating or deactivating, or an indication of the first power mode or the second power mode, or both.

15. The apparatus of claim 13, wherein the instructions are further executable by the processor to cause the apparatus to:
enable a bit indication in the channel state information report, the bit indication comprising an indication of an on demand feedback related to the antenna configuration associated with the channel state information reporting.

16. The apparatus of claim 13, wherein the instructions are further executable by the processor to cause the apparatus to:
determine a format of the feedback message; and
transmit the feedback message according to the format.

17. The apparatus of claim 16, wherein the feedback message is an on demand feedback message, and wherein the format comprises a scheduling request format, a sounding reference signal format, a physical uplink control channel format, or a medium access control channel element format.

18. The apparatus of claim 13, wherein the instructions are further executable by the processor to cause the apparatus to:
receive a second message comprising a second indication of one or more of an aperiodic channel state information reporting configuration for channel state information with an aperiodic channel state information report; and transmit the aperiodic channel state information report according to the aperiodic channel state information reporting configuration.

19. The apparatus of claim 13, wherein the instructions are further executable by the processor to cause the apparatus to:
determine a value of a channel state information report timer; and
transmit the channel state information report based at least in part on the value of the channel state information report timer satisfying a threshold.

20. The apparatus of claim 1, wherein the instructions are further executable by the processor to cause the apparatus to:
receive a second message comprising a second indication of one or more to avoid determining an average of a channel quality indicator over a plurality of channel state information reference signal occasions or to transmit exclusively a latest channel state information report.

21. The apparatus of claim 1, wherein the antenna configuration may comprise a panel configuration, wherein the instructions are further executable by the processor to cause the apparatus to:
activate or deactivate panels of the panel configuration based at least in part on the selected power mode, wherein each panel of the panel configuration comprises a set of antennas.

22. An apparatus for wireless communication, comprising:
a processor,
memory coupled with the processor; and
instructions stored in the memory and executable by the processor to cause the apparatus to:
receive a message comprising an indication of a capability relating to an antenna configuration associated with channel state information reporting;
transmit a channel state information reference signal based at least in part on the capability; and
receive, based at least in part on the channel state information reference signal, a channel state information report, the channel state information report communicated in accordance with a power mode selected based at least in part on the antenna configuration associated with the channel state information reporting.

23. The apparatus of claim 22, wherein the instructions are further executable by the processor to cause the apparatus to:
identify a bit indication in the channel state information report, the bit indication comprising an indication of an on demand feedback related to the antenna configuration associated with the channel state information reporting.

24. The apparatus of claim 23, wherein the instructions are further executable by the processor to cause the apparatus to:
determine one or more of the channel state information reporting or the antenna configuration associated with the channel state information reporting based at least in part on the on demand feedback.

25. The apparatus of claim 23, wherein the instructions are further executable by the processor to cause the apparatus to:
receive a feedback message based at least in part on the on demand feedback.

26. The apparatus of claim 25, wherein the feedback message comprises an indication that a previous channel state information report is invalid, or an indication of a first power mode or a second power mode, or both.

27. The apparatus of claim 25, wherein the instructions are further executable by the processor to cause the apparatus to:
determine a format of the feedback message, wherein receiving the feedback message is based at least in part on the format.

28. The apparatus of claim 27, wherein the feedback message is an on demand feedback message, and wherein the format comprises a scheduling request format, a sounding reference signal format, a physical uplink control channel format, or a medium access control channel element.

29. A method for wireless communication at a wireless device, comprising:
selecting, based at least in part on a capability relating to an antenna configuration associated with channel state information reporting, a first power mode or a second power mode to receive channel state information reference signals, or physical data channels, or a combination thereof;
transmitting a message comprising an indication of the capability;
receiving, in accordance with the selected power mode, a channel state information reference signal using the antenna configuration; and
transmitting, based at least in part on the channel state information reference signal, a channel state information report in accordance with the selected power mode the antenna configuration associated with the channel state information reporting.

30. A method for wireless communication at a wireless device, comprising:
receiving a message comprising an indication of a capability relating to an antenna configuration associated with channel state information reporting;
transmitting a channel state information reference signal based at least in part on the capability; and
receiving, based at least in part on the channel state information reference signal, a channel state information report, the channel state information report communicated in accordance with a power mode selected based at least in part on the antenna configuration associated with the channel state information reporting.

* * * * *